(12) United States Patent
Cocco

(10) Patent No.: US 7,379,782 B1
(45) Date of Patent: May 27, 2008

(54) SYSTEM AND METHOD OF MONITORING AND QUANTIFYING PERFORMANCE OF AN AUTOMATED MANUFACTURING FACILITY

(75) Inventor: Dennis P. Cocco, London (CA)

(73) Assignee: Activplant Corporation, London (CA)

( * ) Notice: Subject to any disclaimer, the term of this patent is extended or adjusted under 35 U.S.C. 154(b) by 0 days.

(21) Appl. No.: 11/691,083

(22) Filed: Mar. 26, 2007

(51) Int. Cl.
*G06F 19/00* (2006.01)

(52) U.S. Cl. .................. 700/103; 700/99; 700/108; 703/2

(58) Field of Classification Search .................. 700/97, 700/99, 103, 106, 108, 111, 121; 703/2
See application file for complete search history.

(56) References Cited

U.S. PATENT DOCUMENTS

| | | | |
|---|---|---|---|
| 5,446,671 A | 8/1995 | Weaver et al. | |
| 5,544,350 A | 8/1996 | Hung et al. | |
| 5,946,661 A | 8/1999 | Rothschild et al. | |
| 6,418,351 B1 | 7/2002 | Martin | |
| 6,564,113 B1 * | 5/2003 | Barto et al. | 700/99 |
| 6,622,055 B2 | 9/2003 | Fan et al. | |
| 6,714,830 B2 | 3/2004 | Browning | |
| 6,725,113 B1 | 4/2004 | Barto et al. | |

(Continued)

FOREIGN PATENT DOCUMENTS

WO   WO 2006/044914 A2   4/2006

OTHER PUBLICATIONS

Szabados, Barna; "Intelligent Monitoring System Used to Control Asynchronous Production Systems": IEEE International Workshop on Virtual and Intelligent Measurement Systems; May 19-20, 2001; pp. 35-40; Budapest, Hungry.

(Continued)

*Primary Examiner*—Leo Picard
*Assistant Examiner*—Douglas S Lee
(74) *Attorney, Agent, or Firm*—Blake, Cassels & Graydon LLP

(57) ABSTRACT

The present invention is directed to a method and system for identifying, quantifying and presenting to a user constraints in an automated manufacturing or processing facility. A data processing system continuously receives basic status signals and state signals from automation equipment in the facility and evaluates and processes these signals to derive a throughput capability measure (a measure of constraint) of each given manufacturing workstation in the process. The throughput capability measure is expressed as a ratio of an ideal cycle time to an accumulated overcycled time. The accumulated overcycled time includes only delays and excludes any speed-up of a workstation. A constraint is identified as the workstation that has the lowest throughput capability measure as compared with all other workstations in a production line. Preferably, throughput capability measures for all workstations are presented to users graphically. Further drill-down can be provided for obtaining more detailed information about the constraint and capacity loss as well as entering information relevant to the constraint, such as a stoppage or slow-down.

25 Claims, 13 Drawing Sheets

U.S. PATENT DOCUMENTS

| | | |
|---|---|---|
| 6,740,534 B1 * | 5/2004 | Adams et al. ............... 438/14 |
| 6,856,847 B2 | 2/2005 | Kao et al. |
| 6,862,486 B2 | 3/2005 | Cocco et al. |
| 2002/0107602 A1 | 8/2002 | Nishida et al. |
| 2002/0138169 A1 | 9/2002 | Sagaguchi |
| 2004/0243268 A1 | 12/2004 | Hsieh et al. |
| 2006/0100731 A1 | 5/2006 | Sugihara et al. |
| 2007/0203606 A1 * | 8/2007 | Quarg ....................... 700/121 |
| 2007/0282475 A1 * | 12/2007 | Schmidt ..................... 700/99 |

OTHER PUBLICATIONS

Kren et al.: "Using Cycle Time to Measure Performance and Control Costs in Foucused Factories"; http://web.archive.org/web/*/http://www.uwm.edu/~Ikren/cycle%20time.pdf; dated Jul. 30, 2003 by web.archive.org and accessed by ISA on Dec. 19, 2007. Avaliable at http://www.uwm.edu/~Ikren/cycle%20time.pdf.
International Search Report from PCT/CA2007/000562 dated Dec. 20, 2007.

* cited by examiner

| Target Parts | Actual | Variance (pcs) | Variance (%) | Attainment(%) | OEE |
|---|---|---|---|---|---|
| 2879.9 | 1498 | 1382 | 48.0 | 52.7 | 52.0 |

$$\text{Availability} = \frac{\text{Operating Time}\ \boxed{2843.4}}{\text{Net Available Time}\ \boxed{2879.9}}$$

$$\boxed{98.7}$$

Downtime Losses =
Downtime: 37.4 Minutes $$\text{Performance} = \frac{\boxed{1498}\ \text{Total Parts} * \boxed{60.0}\ \text{Ideal CT}}{\text{Operating Time}\ \boxed{2842.4}}$$

$$\boxed{52.7}$$

Cycle Time Losses =
Over cycle: 933.2 Minutes $$\text{Quality} = \frac{\text{Good Parts}\ \boxed{1498}}{\text{Total Parts}\ \boxed{1498}}$$

$$\boxed{100.0}$$

Quality Losses =
Rejects: 0 Pieces

FIG. 9

SYSTEM AND METHOD OF MONITORING AND QUANTIFYING PERFORMANCE OF AN AUTOMATED MANUFACTURING FACILITY

FIELD OF INVENTION

The invention relates generally to the field of monitoring performance of manufacturing facilities. In particular, the invention relates to a system and method of monitoring and managing performance of an automated manufacturing facility.

BACKGROUND OF INVENTION

In an automated manufacturing facility, optimal operation of the facility depends on individual manufacturing cells or stations (workcells or workstations) processing parts or workpieces at their respective expected production rate. Workstations not operating at their expected production rate generally constrain product flow and affects overall throughput of the manufacturing process. It is Generally believed that throughput of the facility is limited by its constraints, namely, workstations causing relatively most significant disruption to the production or workflow of the facility. Continuous improvement efforts will likely be hindered if one is unable to determine the constraints in an automated manufacturing facility.

Locating the constraints, however, is not an easy task. This may be particularly so in a facility with sequential production lines. As is known, an automated manufacturing facility often consists of a number of sequential production or processing lines. Each sequential production line consists of several automated workstations linked in a sequential manner. Each of the automated workstations processes a workpiece at a fixed pace as the workpiece moves sequentially from one workstation to the next in the line. In a sequential production line, slowdown at any one of the workstations often causes a ripple effect that spreads both upstream and downstream from the source. Slowdowns can be attributed to many different causes. "Slow cycles", or losses due to a workstation running at a slower than the expected pace, can be one of the contributing factors to the slowdown of a production line. There may also be quality defects, causing processed workpieces being discarded, thus creating gaps in the workflow. Of course, there can always be downtime losses at each workstation, which not only affects the performance at the workstation in question but also creates starved conditions downstream and blocked conditions upstream. As a result, these bottlenecks and quality issues can ripple through the sequential production line and they tend to mask the source of constraints. For example, a workstation may be idle and appear to be causing performance issues but only because it is starved or blocked due to problems upstream or downstream. Buffers between workstations or production lines are often provided to level workflow in order to achieve continuous proceeding or production. Buffering may further mask the real source of constraints.

Metrics are generally used to measure productivity of a manufacturing facility and to measure effectiveness of changes made to workstations or manufacturing environment. Typical approaches to solving the problem of improving performance or productivity in a manufacturing environment generally do not deploy methods of identifying constraints. Instead, these methods focus on collecting a different set of data such as machine faults, overall equipment efficiency ("OEE"), idle time, and scrap rates. These metrics, while providing an indication of the overall performance of a plant, generally do not provide satisfactory guidance as to where a problem may have originated and therefore assist management in locating specific workstations where corrective measures may be required.

To compound the difficulty, often, more and more data are collected in an attempt to improve predictive power of a chosen metric. This information is collected from all workstations in a manufacturing facility. Unfortunately, often a user is left to interpret this increased amount of data to try to identify where constraints in the manufacturing process exist. Because of the complexity of the data and the concurrency of information, this often is difficult. Additionally, there are also disadvantages generally associated with collecting and interpreting a large amount of data, which will only be exacerbated when more data are collected than necessary. It tends to be time consuming and expensive to implement a solution that requires a large amount of data. Any solution deployed also needs to correctly reflect the nature of the data collected. This may call for extra time and effort to understand all of the data and the interrelationship among the types of data collected, which may not be a trivial task. It is therefore desirable to collect only minimally necessary data that still can lead to correct identification of constraints.

There is therefore a need for a system and method for collecting minimum amount of data, i.e., only those relevant to identifying correctly constraints that limit the throughput, and processing the data collected to identify the constraints, and for providing a concise and clear view of where constraints are. It is an object of the present invention to mitigate or obviate at least one of the above mentioned disadvantages.

SUMMARY OF INVENTION

The present invention relates to a system and method for identifying and quantifying constraints in an automated manufacturing or processing facility. The facility has a number of automated workstations. A data processing system continuously receives basic event and state signals from automation equipment in the facility and evaluates and processes these signals to derive a throughput capability measure (a measure of constraint) of each given manufacturing workstation in the process. The automated collection of signals may be further augmented by manually entered information relating to a workstation's performance. The throughput capability measure is expressed as a ratio of an ideal cycle time to an accumulated time that includes any delays or overcycles at a workstation but excludes any speed-up at the workstation. A workstation experiences a speed-up if it processes a workpiece in less than the ideal cycle time. The throughput capability measures of all workstations are analyzed to identify the constraints in the facility.

In one embodiment, a constraint is identified as a workstation that has the lowest throughput. Preferably, throughput capability measures for all workstations are presented to users graphically. This gives users a clear indication of the constraints in the manufacturing flow and a representation of the material flow through the facility. Further drill-down can be provided for obtaining more detailed information about the constraint and capacity loss as well as entering information relevant to the constraint, such as a stoppage or slow-down.

In one embodiment, throughput capability measures are presented to users through a throughput capability and balance map. Each workstation is represented by an icon on the map. Shown in each icon are computed throughput capability measure, and optionally the percentages of capacity loss due to each monitored categories, such as starved and blocked conditions. Each icon is color coded, with the constraints shown in a uniquely identifiable color. Each icon is rendered actuatable for requesting and providing further information. For example, clicking an icon using a computer pointing device may bring up additional details relating to performance of the represented workstation or allow for entering further information.

In a first aspect of the invention, there is provided a system for quantifying and identifying a constraint in an automated manufacturing facility, the automated manufacturing facility having automated workstations for automatically processing workpieces. The system comprises a plurality of signal converters, each of the plurality of signal converters continuously receiving event and state signals collected at a respective automated workstation, and transforming the event and state signals to time and count data, the time and count data including an overcycle time spent by the respective automated workstation during each process cycle of processing a workpiece and a workpiece count; a data modeling engine communicating with the plurality of signal converters; the each signal converter including a computing unit, the computing unit calculating a throughput capability measure of the respective automated workstation upon completion of the each process cycle at the respective workstation, the throughput capability measure being calculated from an expected processing time and an accumulated overcycled processing time accumulated over an accumulation period; and the data modeling engine receiving from the plurality of signal converters the throughput capability measures and identifying the constraint as a workstation whose throughput capability measure meets a preselected criteria, wherein the overcycle time is a non-negative quantity derived from a difference between a cycle time of the each process cycle and an ideal cycle time, the overcycle time excluding time spent by the respective workstation during starved and blocked states during the each process cycle, wherein the expected processing time and the accumulated overcycled processing time are accumulated from the ideal cycle time and an overcycled processing time, respectively, over the accumulation period, and wherein the overcycled processing time is a sum of the overcycle time and the ideal cycle time.

In a feature of this aspect of the invention, the system further includes historical data database and a queue manager, which arranges for the storing of the converted time and count data in the historical data database.

In another feature of this aspect of the invention, the system further includes further a graphical user interface for displaying a graphical representation of the throughput capability measures of the workstations to a user, the graphical representation including workstation icons, each of the workstation icons corresponding to one of the workstations and showing a numerical value of the throughput capability measure. In a further feature of this aspect of the invention, the graphical representation includes one or more state icons positioned adjacent each workstation icon of the workstation icons, the one or more state icons each showing a time percentage the each workstation spending in a represented respective state.

In a second aspect, there is provided a system for quantifying and identifying a constraint in an automated manufacturing facility, the automated manufacturing facility having sequentially linked, automated workstations for automatically processing workpieces. The system comprises a plurality of signal converters, each of the plurality of signal converters continuously receiving starved, blocked and EOC signals collected at a respective automated workstation, and transforming the starved, blocked and EOC signals to time and count data, the time and count data including a measured cycle time spent by the respective automated workstation processing a workpiece during each process cycle, an overcycle time spent by the respective automated workstation during the each process cycle and a workpiece count; data accumulators for accumulating the time and count data received from the each signal convertor, the accumulated time and count data including an accumulated overcycle time, an accumulated ideal processing time and a total workpiece count over an accumulation period; a historical data database for storing the time and count data and the accumulated time and count data; a data modeling engine communicating with the plurality of signal converters and the historical data database; the each signal converter including a computing unit, the computing unit calculating a throughput capability measure of the respective automated workstation upon completion of the each process cycle at the respective workstation, the throughput capability measure being calculated from a ratio of the accumulated ideal processing time to an accumulated overcycled processing time; and the data modeling engine receiving from the plurality of signal converters the throughput capability measures and identifying a workstation having the smallest throughput capability measure as the constraint, wherein the overcycle time is a non-negative quantity derived from a difference between the measured cycle time and an ideal cycle time, wherein the accumulated ideal processing time is a product of the ideal cycle time and the total workpiece count, and wherein the accumulated overcycled processing time is a sum of the accumulated ideal processing time and the accumulated overcycle time.

In another aspect of the invention, there is provided a method of monitoring and managing performance of an automated processing facility. The method includes the steps of: continuously receiving state and event signals automatically collected from workstations in the automated processing facility; converting the state and event signals to time and count data, the time and count data of each of the workstations including at least an overcycle time, the overcycle time being a non-negative quantity derived from a difference between a measured cycle time and an ideal cycle time; accumulating the time and count data over an accumulation period for the workstations, the accumulated time and count data including at least a total count of workpieces processed by the each workstation during the accumulation period and an accumulated overcycle time accumulated from the overcycle time; continuously computing a throughput capability measure for each workstation upon the each workstation completing processing a workpiece, the throughout capability measure being computed from the total count, the accumulated overcycle time and the ideal cycle time; and identifying a constraint in the automated manufacturing facility from the throughput capability measures of the workstations, the constraint being a workstation having the smallest throughput capability measure.

In a feature of this aspect of the invention, the time and count data of the each workstation includes a first amount of time spent by the each workstation in starved state and a second amount of time spent by the each workstation in blocked state, and the method further includes the step of displaying the throughput capability measure, information derived from the first amount of time and information derived from the second amount of time in icons associated with the each workstation. In a further feature, the method includes further the step of color coding icons associated with said each workstation in accordance with numerical values of said throughput capability measures.

In other aspects the invention provides various combinations and subsets of the aspects described above.

BRIEF DESCRIPTION OF DRAWINGS

For the purposes of description, but not of limitation, the foregoing and other aspects of the invention are explained in greater detail with reference to the accompanying drawings, in which.

FIG. 9 is another exemplary screen display showing detailed information related to OEE;

DETAILED DESCRIPTION OF EMBODIMENTS

Figure 1:
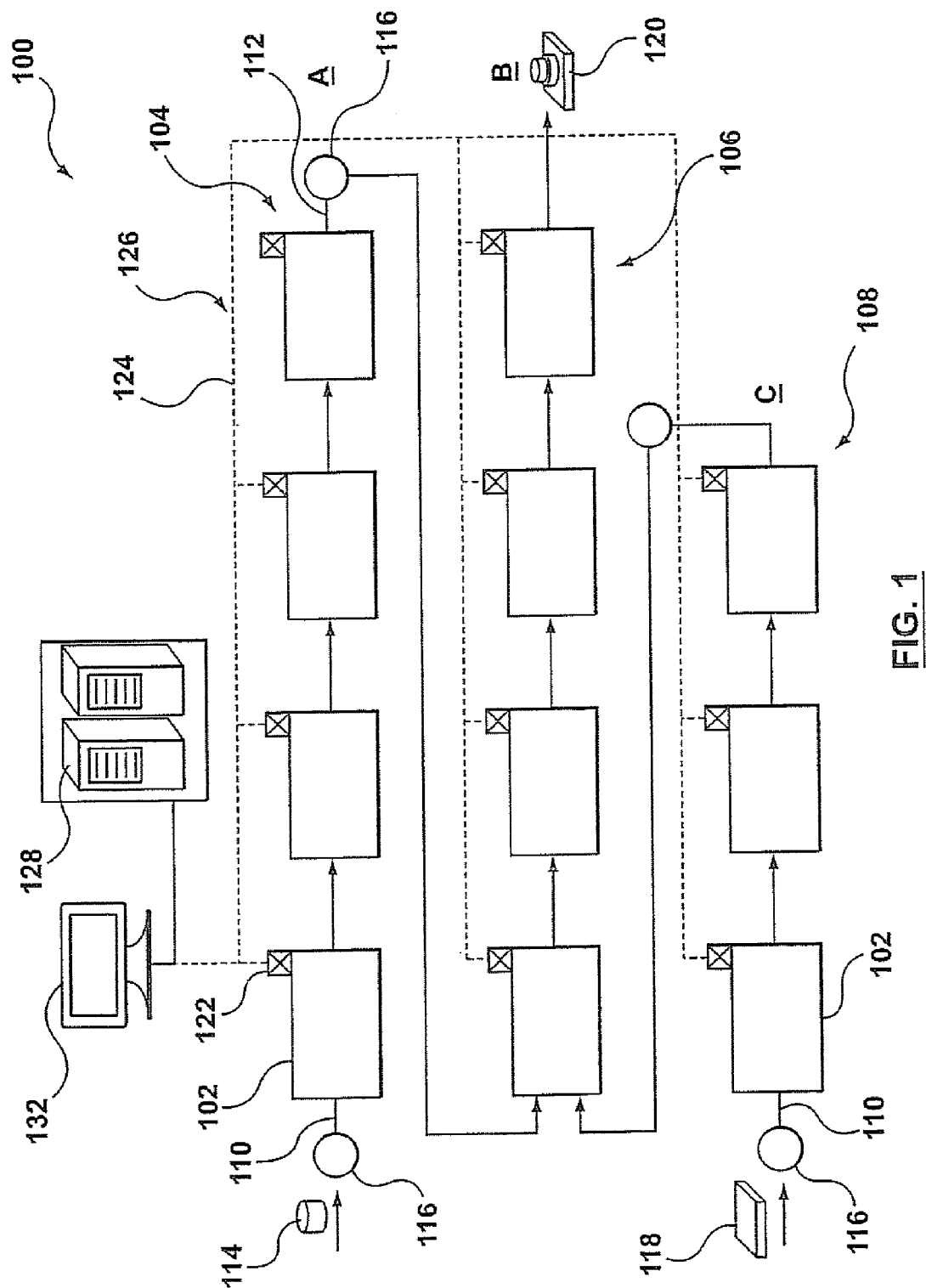
FIG. 1 shows schematically an automated processing facility, interfaced with and monitored by a computer implemented performance management system according to an embodiment of the present invention.

The description which follows and the embodiments described therein are provided by way of illustration of an example, or examples, of particular embodiments of the principles of the present invention. These examples are provided for the purposes of explanation, and not limitation, of those principles and of the invention. In the description which follows, like parts are marked throughout the specification and the drawings with the same respective reference numerals.

The present invention relates to a system and method for identifying and quantifying constraints in an automated manufacturing or processing facility. The facility has a number of automated workstations. In an embodiment the system utilizes automatically collected event and state signals from each workstation and processes these signals to derive a throughput capability measure for each workstation. The automated collection of signals is further augmented by provision of input devices that allow users to manually enter information relating to a workstation's performance. Instead of collecting a large number of signals, the system collects a small number of core event and state signals (three in one embodiment), and correlates these signals with their time data to derive a throughput performance measure. A data modeling engine is provided for analyzing throughput capability measures of all workstations to identify the constraints in the facility. The throughput capability metric, comprising throughput capability measures of all monitored workstations in the facility, is presented graphically to users to provide clear indications of constraints. Results are also analyzed to provide statistics as to performance losses or causes to performance losses so that a user is provided with guidance as to where and what types of improvements should be made.

FIG. 1 shows schematically an automated processing facility 100. The automated processing facility may be any manufacturing facility, processing facility, or testing facility, or any facility that includes a number of processing units that are or can be automated. For example, the facility may be an automated production line of automobiles, an automated semiconductor fabrication facility, or a bottling facility that includes a number of automated bottling lines of beverages. The facility 100 has a number of automated assets 102 in the nature of workstations, workcells or processing stations. An asset 102 is a piece of equipment that is capable of functioning independently from other pieces of equipment. An asset 102 may generally correspond to a machine, a group of machines or even a part of a machine. These automated assets are generally grouped into sequential production or processing lines, such as production line A (104), production line B (106) and production C (108).

Each sequential production or processing line 104, 106, 108 has a line input point 110 and a line exit point 112. Several automated assets 102 are linked sequentially between a line's input point and the line's exit point to form the sequential production line. A workpiece 114 enters a production line at its input point 110. A workpiece is processed at each workstation and may be a partially assembled automobile in an automobile assembly line, an empty bottle in a bottling facility, or a semiconductor wafer in a semiconductor fabricating facility, among others. In an automated testing facility, a workpiece may be a finished product that is to be subject to a sequence of automated tests or a sample that is to be analyzed at each of the automated data collection and analysis workstations. The workpiece is processed sequentially at each one of the assets 102 of the production line until it reaches the exit point 112 of the production line.

A buffer 114 may be provided at a line's input point or exit point. In sequential production, a workpiece processed by the production line has only one flow path to choose from, namely the path defined by the sequentially linked assets. In such a sequential production line, the next workstation a workpiece must go is fixed. The timing of the workpiece moving from workstation to workstation, however, is not fixed and is dependent on the individual process being completed at each workstation. Because of the independent timing, a buffer 114 provided at each production line's input point or exit point helps maintaining a consistent level of workflow between production lines. Preferably, buffers are also provided between workstations to help level workflow further so that continuous processing or production can be achieved. Buffer level often provides some indication as to whether a workstation has been operating at a designed production or processing rate.

A production line's exit point 112 may be linked to another line's input point 110, to process further the partially processed workpieces. In an iterative process, a line's exit point may also be linked back to its own input point to process the workpieces multiple times before they are handed over to the next production line for further processing. Other configurations are also possible. FIG. 1 shows one exemplary configuration in which the exit points of line A (104) and line C (108) are linked to the input point of line B (106). The first workpiece 116 processed by line A and the second workpiece 118 processed by line C are further processed by line B to produce a combined product 120 at the exit point of line B.

Each automated asset 102 may have a programmable logic controller 122 (PLC) or similar control device installed thereon. A PLC is a piece of computer hardware responsible for operating the asset 102 in a predetermined manner. It generally includes sensors or has interface for receiving inputs from sensors for detecting state and triggering events or measuring monitored conditions. A PLC contains one or more memory registers to collect data from its associated asset 102. Internal logic of PLC 122 populates its memory registers with data regarding monitored conditions of asset 102. Each memory register stores data associated with a separate monitored condition of asset 102. For example, value in one memory register tracks starved condition of asset 102 while value in another memory register tracks blocked condition of the asset. A PLC can be programmed with a number of logic conditions or "ladders" that allow it to respond to changing input and operate the asset accordingly. Some functions performed by a PLC include quality monitoring (e.g., to ensure parts are loaded correctly), process monitoring (e.g., to ensure that a given process is completed within acceptable specifications, such as rivet pressure, drill depth, etc.), and safety monitoring (such as monitoring of safety gates, light curtains, emergency stop buttons, etc.). Although PLC 122 as shown in FIG. 1 is connected to asset 102 through a data link, it will be appreciated that PLC 122 may be integrated with asset 102 providing direct connection between memory registers and the means of gathering the data stored therein.

Communication links 124, such as wired or wireless data links, connect all PLCs together to form a monitoring network 126. Signals are continuously collected by PLCs and are further transmitted through the monitoring network to a computer 128, or several computers, on which a data processing system in the nature of a software system 130 is executing. Any suitable data transmission protocol or protocols may be used for transmitting the collected signals. One or several display and input devices 132, such as a computer monitor and a keyboard, or a touch screen, are provided and connected to the software system 130, for users to display status of monitored assets 102 and to enter any information relating to the assets. As will be described in great detail below, the software system 130 processes signal data collected by PLCs 122 and computes the throughput capability measure of each of the assets 102 in accordance with a methodology described herein. Preferably, the throughput capability measures are presented to a user graphically. The software system 130 can also conveniently provide a user interface, for example, a graphical user interface displayed on a computer monitor 132, for accepting user inputs relating to any one of assets 102.

Figure 2:
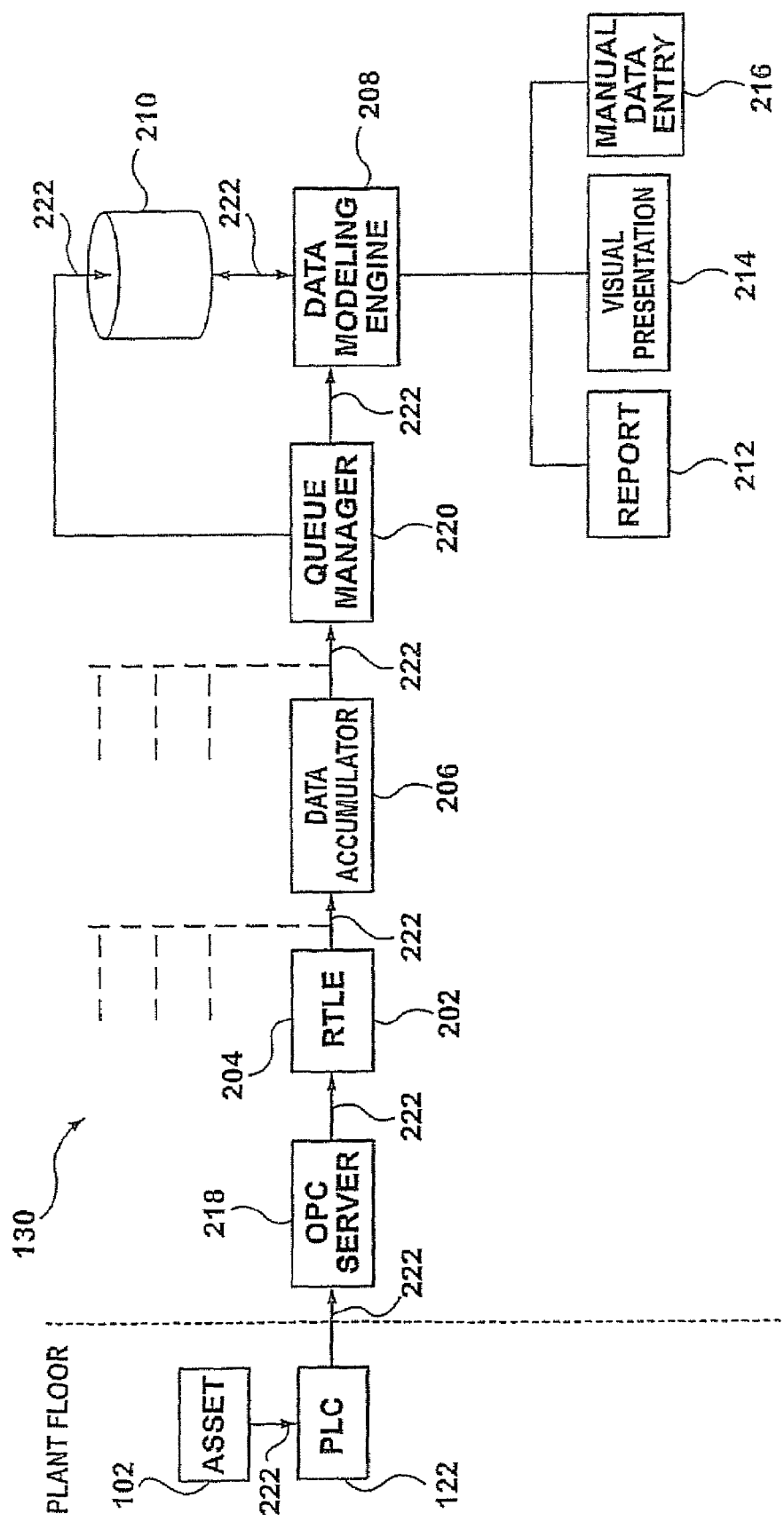
FIG. 2 is a block diagram showing a performance management system for identifying and quantifying constraints in the automated processing facility illustrated in FIG. 1.

FIG. 2 is a block diagram showing a software system 130, interfaced with PLCs, according to one embodiment of the present invention. The software system 130 includes a plurality of signal converters 202 in the nature of RTLE 204 (real-time logic engine), data accumulators 206, and a data modeling engine 208. The data modeling engine 208 includes or is interfaced with a historical data database 210, which may be standalone or as part of the software system 130, a report module 212, a visual presentation module 214, and a manual data entry tool 216. Optionally, an OLE for process control (OPC) server 218 is provided between a PLC 122 and a signal converter 202. A queue manager 220 is preferably provided between data accumulators 206 and data modeling engine 208.

The software system 130 continuously receives data inputs from a collection of PLCs 122, each PLC being installed on a workstation 102 in a plant. The arrows 222 indicate the flow of raw signal data from sensors at each workstation to PLCs 122, pre-processed or formatted by OPC server 218, processed by RTLEs 204 and data accumulators 206, possibly buffered at the queue manager 220 and written by the queue manager 220 into a historical data database 210, which are manipulated and analyzed by data modeling engine 208.

Figure 3A:
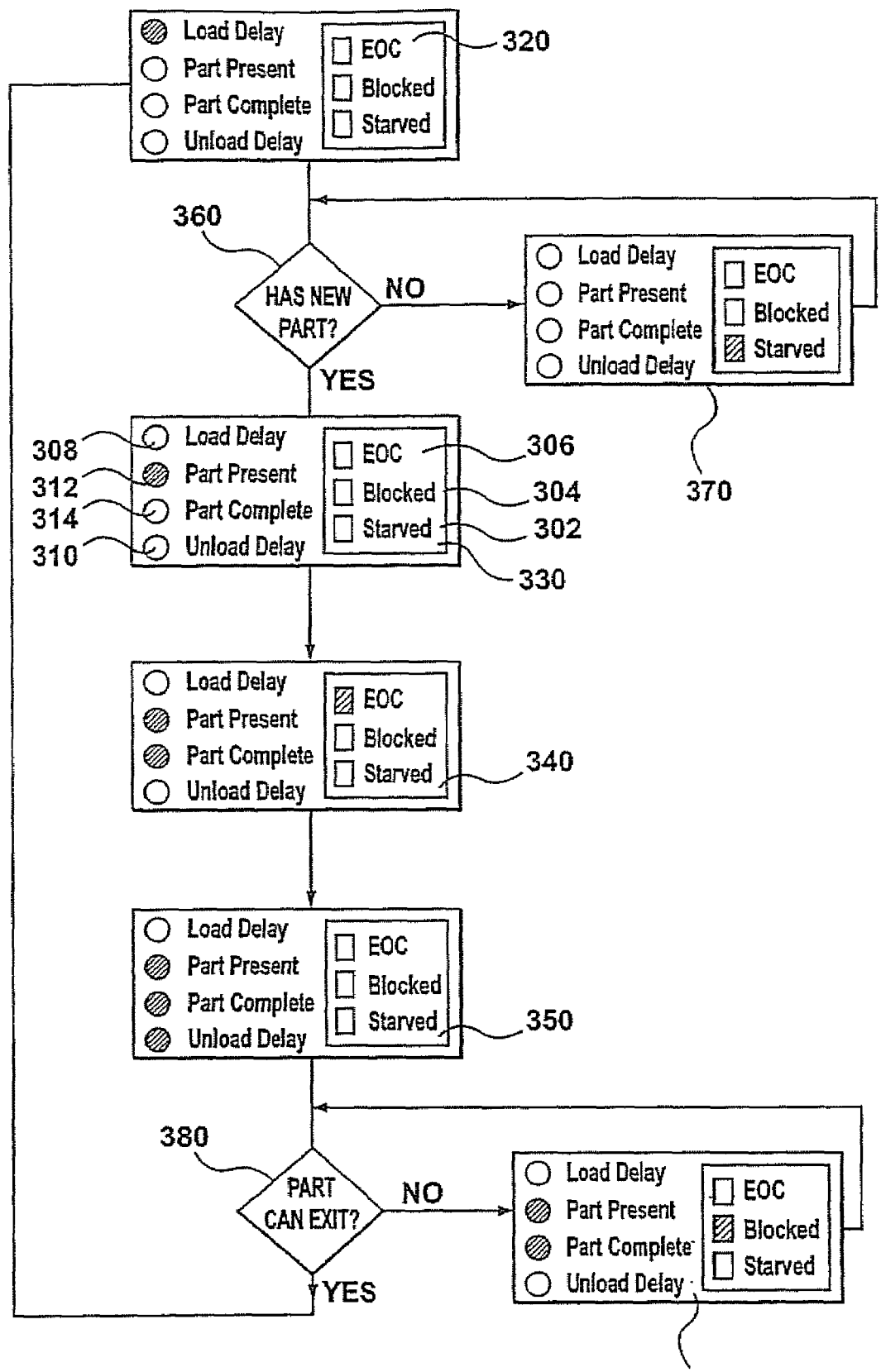
FIG. 3A illustrates schematically a workstation cycle and generation of end-of-cycle, blocked and starved signals.

At each workstation 102, a PLC 122 is interfaced with the workstation, for continuously collecting event and state signals from the workstation. Referring to FIG. 3A, the PLCs are programmed to collect a minimum set of three state and event signals: starved bit 302, blocked bit 304 and EOC ("end of cycle") bit 306. Starved bit 302 is used to indicate a "Starved" condition, i.e., when a workstation is idling and waiting for the next workpiece to arrive. This is when the work station has finished unloading from the last finished cycle (that is, has passed its completed part to the next workstation), but a new part is not present in the station after a given delay, or a new part is not ready at the previous workstation. This condition may happen when, for example, both the buffer at the input point ("input buffer") and the workstation are empty, which may be caused by a slowdown at an upstream workstation or workstations. Or, a workstation may be starved for material which prevents the workstation from completing its process cycle. Blocked bit 304 comes on when the station has finished a cycle and the downstream workstation is not available to receive the completed part. This happens when downstream workstations are not ready to receive more parts, for example, because there is a slowdown at a downstream workstation or workstations. EOC bit 306 can be programmed to come on at the same point in each cycle. Typically it is used to indicate a "Cycle Complete" or "End of Cycle" condition. For example, the EOC bit 306 is turned on each time the workstation completes processing a workpiece. Conveniently, the EOC bit remains on for a short period (e.g., 3 seconds) to ensure its detection by RTLE or OPC server. Any other suitable periods, for example from 1 to 3 seconds, depending on polling rate or such other parameters, may be used as long as the EOC bit remains on sufficiently long to ensure its detection.

Other signals, such as faulted state, quality loss, product or manufacturing process related identifiers, etc. may also be collected. Collecting additional signals can increase the amount of information that the system can report on. For example, the PLC may collect a "Quality" signal by adding a quality bit to its memory registers (not shown). Quality bit comes on in conjunction with the "EOC" signal. If at the end of a cycle the "Quality" signal is "ON" then a rejected or scrap piece is counted. The PLC may also collect one or several identifier signals. Such identifiers may include product code, product model, part types, process batch type, option content, etc., or any kind of desirable identifier. For example, a "Model ID" signal can be collected. Model ID indicates the current running model and is usually given as an alphanumeric value, for identifying production line configuration or workpieces being processed. The system can use the Model ID to adjust or retrieve model-based parameters. As will be described later, the value of an ideal cycle time varies from model to model, which can be conveniently adjusted or retrieved from a database based on the value of Model ID. Reports and visual presentations can also make use of the "Model ID" as a filter, allowing various metrics to be displayed and sorted by model.

A workstation itself may have other status bits that the workstation uses to determine what stage of the cycle it is in. Some of the common conditions monitored by a PLC include: "Load Delay", "Part Present", "Part Complete" and "Unload Delay". In many cases a workstation has a built-in delay between the time when it discharges a finished workpiece and the time when it loads a new workpiece. "Load Delay" represents a given delay while a workpiece is being loaded. The "Load Delay" bit 308 is turned on during loading, but since this is part of the normal cycle, the workstation is neither blocked nor starved. Similarly, a workstation may have a built-in delay when it unloads a finished workpiece. The "Unload Delay" bit 310 comes on during unloading and a new cycle is ready to begin again when this bit is turned off. The "Part Present" bit 312 is turned on after the load delay. A new workpiece is considered loaded and a new processing cycle begins. The "Part Complete" bit 314 is turned on at the end of the process cycle. The EOC bit 306 may be turned on at this point and kept on for a pre-determined period, such as 3 seconds, or any other period (for example, from 1 to 3 seconds) that is sufficiently long to ensure its detection by RTLE or OPC server.

Figure 3B:
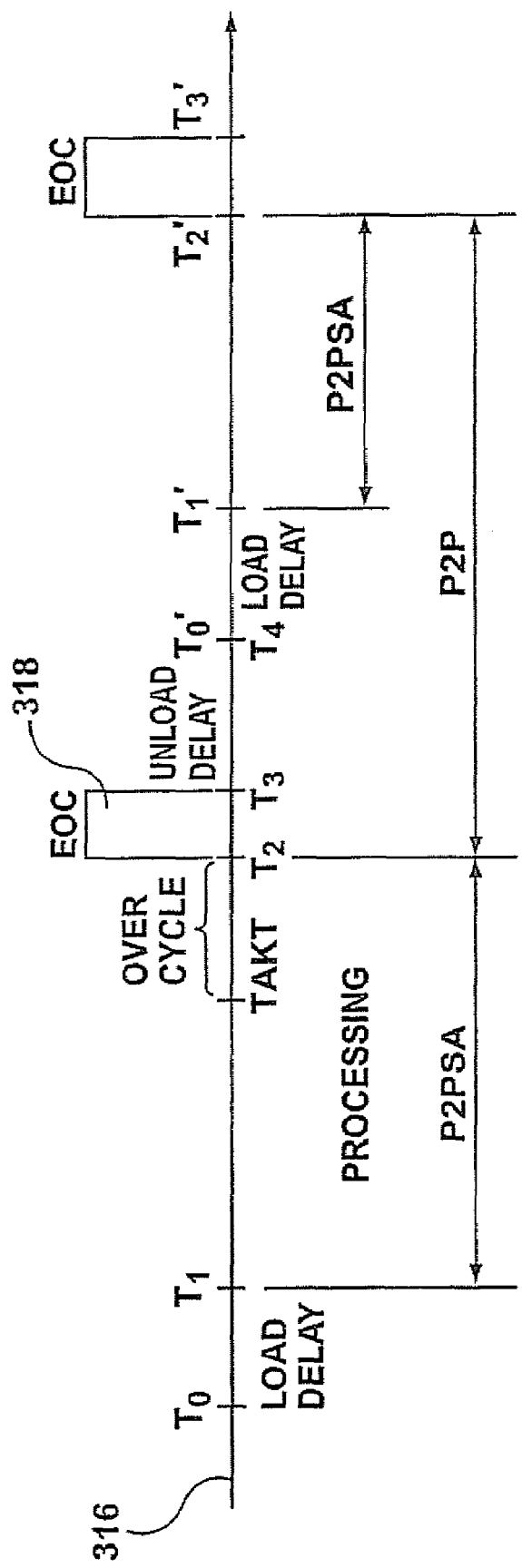
FIG. 3B illustrates along a time axis time markers associated with various state and event signals and conversion of these signals to basic time and count data.

FIG. 3A illustrates schematically a typical machine cycle from "Load Delay" (step 320), through "Part Present" or start of processing cycle (step 330), "Part Complete" or EOC (step 340), "Unload Delay" (step 350) and back to "Load Delay" again. A solid or filled-in circle or small rectangle indicates a bit switched on and an unfilled circle or small rectangle indicates a bit switched off. Referring to FIG. 3B, the events shown in FIG. 3A are also marked on a time axis 316. Time $T_0$ indicates the start of the cycle, when the "Load Delay" bit 308 is first turned on. The "Load Delay" bit 308 is turned off at time $T_1$ after the built-in delay. When the workpiece is in the workstation, the "Part Present" bit 312 is turned on. This is when the workstation starts processing the workpiece. After the workstation completes processing the workpiece at time $T_2$, the "Part Complete" bit 314 is turned on. The time duration between $T_1$ and $T_2$ is also generally referred to as "P2PSA" time, or part-to-part stand-alone time. As will be described in great detail later, if the P2PSA time is longer than an ideal cycle time, takt time, the workstation is considered overcycling and the difference between the P2PSA time and the takt time is collected as unit overcycle time. The EOC bit 306 is turned on at $T_2$, for 3 seconds, which provides the end-of-cycle signal 318, or EOC signal. Finally, the "Unload Delay" bit 310 is turned on at $T_3$ and kept on for the duration of a built-in unload delay until $T_4$. The moment $T_4$ also coincides with $T_0'$ of the next cycle. The time between the beginning of EOC in neighboring cycles is generally referred to as "P2P" time, or part-to-part time.

Refer to FIG. 3A again. After the previous workpiece has exited, the workstation is now expecting another workpiece to enter. The "Load Delay" bit is turned on, in anticipation of the loading of a new workpiece. However, after a given time delay (may be zero), the workstation may find itself without a new workpiece (step 360) and the "Part Present" bit 312 remains off (step 370). When this happens, the station reports its condition as "starved" and the Starved bit 302 is turned on. The workstation will remain in this state, i.e., the starved bit 302 will be kept on, until a new workpiece enters the workstation. Similarly, at the end of a cycle the EOC bit 306 is turned on and held on for 3 seconds. If after a built-in unload delay, i.e., after the "Unload Delay" bit is cleared, the completed workpiece cannot exit (step 380) and is still present in the workstation, the station reports its condition as "Blocked" and the Blocked bit 304 is turned on (step 390). The blocked bit 304 will be held on until the workpiece exits the workstation, i.e., until the "Part Present" bit 312 is cleared.

Signals collected by PLCs are explicitly or implicitly associated with time information. A PLC may be programmed to use the time information and accumulate amount of time the workstation spent in starved or blocked state, amount of time the workstation spent between consecutive EOC signals, or may accumulate, i.e., increment a total unit count each time an BOC signal is received to track the total number of workpieces processed. A PLC may also be programmed to perform more complicated calculations. However, although a PLC is programmable, modification of PLC logic to collect additional signals or perform additional calculations in an already operational PLC tends to be discouraged as such modification can be time consuming and may require extensive "proofing" to ensure regular operations are not impacted in any way. Preferably, any calculation and accumulation are left to signal converters 202 for improved performance and reduced implementation costs. Calculation and accumulation of time and count data will be further described in detail later.

It will be appreciated that although PLCs are described here as the device for collecting signals, it is only because typically PLCs are already installed in an automated facility for collecting signals at each workstation. In most installations, PLCs may already collect the minimally necessary signals required by the system. It is not required that PLCs must be used. Any sensors capable of collecting state and event signals used by the software system 130 can be used in addition to or in place of PLCs.

OPC servers receive data from PLCs. OPC is a standardized protocol for communicating data between systems in a controlled process and its functionalities. OPC server 218 collects and formats data stored in memory registers of each PLC 122 connected thereto and provides the standardized data to signal converters 202, or RTLEs 204. Typically, OPC server 218 collects such data by periodically reading memory registers, commonly at a rate of once per second. OPC server 218 stores the read data in its internal memory in a standardized manner along with source information indicating the memory register and asset 102 from which the data was collected. Signal converter 202 is provided the data and source information in the standardized manner, allowing it to properly interpret and process the data collected. OPC server 218 therefore provides a standardized data access interface for data signal converter 202 to request and receive data from memory registers of PLC. Collection and format of data stored in internal memory of OPC server 218 are known to those skilled in the art.

PLC 122 and/or OPC server 218 can be configured so that the value of a particular memory register causes OPC server 218 to forward the standardized data to signal converters and data collectors. Such data collection is referred to as triggered or unsolicited data collection. Data collected this way may be further analyzed and formatted by RTLEs or data accumulations for storage in database 210. This represents a data "push" model. A signal converter may also "pull" data from OPC server 218. Such requests are typically forwarded to OPC server 218 which collects the appropriate data from its internal memory and returns the collected data to a signal converter 202, again in the standardized format. Such data collection by signal converters is referred to as non-triggered or solicited data collection. Again, signal converters and data collectors may further analyze and format the data for storage in database 210. Examples of OPC servers, signal converters and data collectors operating together to collect data from PLCs and storing the data in a database are provided in U.S. Pat. No. 6,862,486, which is incorporated herein by reference.

Signal converters 202 receive "raw" data items, such as event and state signals, from sensors or OPC servers and convert them to counter and time data. Each data item includes data retrieved from a memory register indicating a value of a monitored condition of a PLC 122, information regarding the source of the data item (i.e. asset 102) and may also include time information about the data which is provided by OPC server 218. Each of the collected data, or information derived therefrom, is stored as records in one or more tables in database 210. The collected data may be accumulator data such as a number of parts processed by an asset in a time interval (count), or total idle time of a machine during a time interval (time), or the collected data may be incident data, typically having a start time, an end time and a duration. Such data is typically generated when a monitored condition of an asset 102 switches from an "on" status to an "off" status or vice versa. Data collected at PLCs and further processed by signal converters are in general explicitly or implicitly associated with a time marker. The time marker associates each record for a data item with either a time interval or a time of recordal. Having independent records with an associated time marker provides flexibility when processing and manipulating the records. Further information, such as a percentage a machine spending in certain states, can also be derived, i.e., computed by the signal converter form basic time and counter data.

Signals collected at PLCs are forwarded to RTLEs 204 for processing. Generally, a RTLE 204 is programmable and can be used to perform a variety of calculations and logic operations. Its memory, or registers, may also be programmed as timers or counters. RTLEs are generally easier to program than PLCs and are provided to off-load any required programming from a PLC or a group of PLCs connected thereto. As described earlier, a PLC collects at least the starved bit 302, the blocked bit 304 and the EOC bit 306, which are all associated with their respective time information. By tracking the time a starved (or blocked) bit is switched on and off, i.e. correlating the time information with the state signal itself, one can measure (or derive) the amount of time the monitored asset 102 spent in the starved or blocked state. Similarly, the turning on or off of the EOC bit 306 also allows the RTLE 204 to track the part-to-part cycle time and to generate a signal for accumulating part counts. Time spent between consecutive ends of cycle is measured or calculated to obtain a part-to-part cycle time. Total number of workpieces processed is also incremented each time the workstation is at the end of cycle. Other count data and timing signals such as buffer counts, time of a workpiece entering and exiting the workstation, may also be tracked and computed. The RTLE 204 also tracks a measured cycle time to evaluate overcycle time for each workpiece immediately or shortly after the workstation completes processing the workpiece. The measured cycle time is the time a workstation actually spent processing a workpiece. This is measured by computing, accumulating or tracking the duration between the time the workstation begins processing a workpiece and the time the workstation completes processing the workpiece. Load delays, unload delays and time spent during starved or blocked states are not included in a measured cycle time. The overcycle time, namely the difference between a measured cycle time and an ideal cycle time, is computed and accumulated. The overcycle time is a measure of extra time spent by the workstation to process a workpiece and the measured cycle time represents an overcycled processing time.

The ideal cycle time is not a measured quantity. Rather, it is a design parameter, representing a designed production or processing rate or expected pace and is often known as "takt" time. Takt time represents a "beat", or fixed pace, at which each workstation in a production line is expected to complete a processing cycle. For smooth, continuous processing, each workstation of a production line is expected to process at this pace and therefore takt time actually represents the "beat" of the production line, not just individual workstations. Each workstation is expected to process a workpiece spending precisely its takt time, no more, nor less. If a workstation spends more time than the ideal cycle time to complete processing a workpiece, it is said to be overcycling. When a workstation overcycles, it slows down the sequential line. The line then can process workpieces at best at the rate of the overcycling workstation. When a workstation overcycles, it also can create starved condition for the immediate downstream workstation and blocked condition for the immediate upstream workstation, which may ripple through the entire line or facility. On the other hand, when a workstation spends less time than the ideal cycle time to complete processing a workpiece, there is a speed-up of the workstation. A speed-up does not necessarily contribute to the overall productivity of a facility, as other workstations are still operating at or below the expected rate, i.e., spending at least the takt time to complete a workpiece. A speed-up of a workstation actually may cause performance degradation as it may introduce blocked condition downstream into a sequential production line.

Selection of a takt time may take into account the maximum processing capacity of a workstation, the tasks to be completed at a workstation, the part to be processed, and the overall production or processing rate of the line, among others. In particular, takt time is a parameter varying from product to product, or model to model. Takt time data corresponding to different products, models, parts or tasks may be conveniently stored in database 210 or other storage device for retrieval by RTLE 204. When a Model ID signal is also collected, the value of takt time can be automatically adjusted or retrieved.

Performance or throughput of a workstation can be measured by comparing its cycle time against the ideal cycle time. There is a reduction of throughput when a workstation spends extra time to process a workpiece, i.e., when there is a non-zero overcycle time. What is not evident is that speed-up at any workstation generally does not contribute to a production line's throughput and that its inclusion in the computation of throughput may obscure the source of constraints. To exclude speed-up, overcycle time is set to zero, rather than some computed negative value. The throughput capability measure can be computed from the following formula:

$$\text{Throughput capability} = \frac{T_{expected}}{T_{expected} + T_{overcycle}} \quad (1)$$

Here, the total overcycle time, $T_{overcycle}$, is the time accumulated from overcycle time spent by a workstation processing individual workpieces over a given accumulation period. $T_{expected}$ is the total amount of time expected for processing the total number of workpieces during the accumulation period. The sum, $T_{expected}+T_{overcycle}$, represents an accumulated overcycled processing time. In one embodiment, a simple formula can be used, which is $T_{expected}=N_{units}\times$(Takt Time), where Takt Time is the ideal cycle time and $N_{units}$ is the total number of workpieces processed. Further variations of the simple formula (Eq. (1)) is also possible, wherein any non-zero $T_{overcycle}$ reduces the value of the throughput capability measure. Conveniently, RTLEs 204 are programmed to compute the throughput capacity for each of the workstations 102.

RTLEs 204 also analyze time and count data and carry out further computations of other performance related parameters. For example, overall attainment of a workstation (or each production line or the entire facility), a performance indicator, can be computed from a total number of workpieces processed and the total time the workstation has been available (i.e., total lapsed time excluding accumulated downtime). Other quantities that can be computed from the data collected may include jobs per hour (JPH), mean time between failures (MTBF), or mean time to repair (MTTR). Additionally, data received from workstations can be analyzed to obtain overall percentages of accumulated time a workstation spent in a loss state, such as blocked state, starved state, or downtime state, or to categorize overall percentage of losses by categories, such as uptime losses, downtime losses, or speed losses, or any other derived performance indicators.

Data accumulators 206 collect data from RTLEs 204 and passes the collected data to queue manager 220 for insertion into the database 210. A data accumulator may simply pass the collected data to the queue manager, in which case the data accumulator is essentially a transitory storage for holding and buffering the collected data. The buffering helps reducing data loss in case of any network slowdown or latency, when data cannot be written in the database immediately. Further computation or manipulation may also be performed by data accumulators 206. For example, accumulation of time or count may be performed by data accumulators 206. Computation of percentages and other more complicated calculations may also be carried out by data accumulators 206 in principle.

While in general there is a 1-to-1 correspondence between OPC server and RTLE, typically a data accumulator may receive data from several RTLEs, as indicated with dashed lines in FIG. 2. Similarly, each queue manager may collect data from several data accumulators. The number of RTLEs a data accumulator can serve is generally determined by loads. Load also Generally determines the number of data accumulators a queue manager can serve.

Queue manager 220 handles data queues and inserts data into the database. Queue manager formats data items collected from data accumulators 206, creating transaction messages, queuing such messages and updating database 210 with the data contained in these messages. Each transaction, for example, an SQL transaction, either creates or updates a record in database 210.

Data modeling engine 208 provides a platform for the modeling and manipulation of data collected by and received from signal converters 202 and data accumulators 206. It also acts as the platform for web-based applications and as the server that retrieves data from the database 210.

Report module 212 is primarily a reporting tool that is part of or connected to the data modeling engine 208. Report module 212 carries out the necessary calculations using data stored in the database 210 and provides, for example, plant configured reports on constraints, metrics and performance indicators.

Visual presentation module 214 is primarily responsible for producing display screens for visualizing collected and calculated information. It may provide webportals (not shown) or other visual or graphical display tools for visual presentation of information and data.

Manual data entry tool 216 is a software module or software tool that allows for manual data collection from plant floor on constraining assets, though it may also provide a user interface for entering other information. Manual data entry tool can also be used to help troubleshoot constraint issues at individual pieces of equipment or processes.

As will be understood, although the performance monitoring and management software system 130 shown in FIG. 2 includes OPC servers, RTLEs, data accumulators, a queue manager and a data modeling engine, among others, these components do not have to reside in a single object or executable computer file, nor do they have to execute on a single computer hardware. For example, there may be a large number of computers, each having a number of RTLEs executed thereon, but only a single, additional computer that hosts the data modeling engine component. Other hardware and software configurations, of course, are also possible. How to select a suitable hardware and software configuration is mostly an engineering choice. As described earlier, signals relating to losses at a workstation, such as "Quality" signal, can be collected at machine level for further processing and analysis. Losses can be categorized in different ways. Conveniently, one way to categorize losses is to categorize them into one of uptime, downtime, speed and quality losses. Each of these four categories highlights potential losses of throughput or first time quality capability at a machine level. These losses can be estimated from other signals, such as starved bit, blocked bit, or can be measured or validated with machine level data, i.e., data collected by PLCs or sensors installed at each workstation, or can be collected manually at each work station. As will be described below, manual entry screens can be provided for accepting user inputs and capturing the relevant information. Conveniently, a graphical user interface presented to users through display and input devices 132 may be employed for this purpose.

"Uptime losses" generally refer to losses at an asset while the asset is operational, i.e., losses not due to downtime of an asset. Both starved and blocked conditions create losses while the workstation is operational and are therefore also "uptime losses". Other examples include time spent on trial-run of a process (therefore no products produced), operator's lunchtime, change-over of product types, or idle time when there is no demand.

Time spent by a workstation from the moment a workpiece enters the workstation to the end of the ideal cycle time is referred to as cycling time 406. Spending time longer than takt time but still below a threshold is considered a speed loss 408, i.e., a loss caused by slow down at an asset. The threshold, such as 110% of takt time, is to a large degree arbitrary. This threshold is generally selected by a user and based on the user's experience and knowledge of past performance of the asset. An asset spent time longer than the threshold to complete processing a workpiece is considered to have experienced downtime. Losses attributed to downtime are referred to as "downtime losses", losses caused by downtime of an asset. When computing downtime losses, however, the entire overcycle time 410, i.e., time between 100% takt time and end of cycle, is included in the calculation. Time spent processing a workpiece that is later discarded or requires reprocessing due to quality failure is categorized as quality loss.

The following chart shows examples of deriving loss data from signals collected at PLCs and augmenting the derived data with manual entry data. It will be understood that the threshold levels are for illustration only and can be fully adjustable by a user depending on each machine function and cycle time.

| Loss | Loss Data |
|---|---|
| Speed Loss | classify all cycle times from 100% to 110% of ideal cycle time as speed losses |
| Downtime Loss | create a down time loss incident when cycle time is longer than 110% of ideal cycle time (reset on EOC) use manual entry screen for reason code entry |
| Uptime Loss | create a starved incident or blocked incident when the starved bit or blocked bit is on use manual entry screen for reason code entry |
| Quality Loss | automated collection of number of parts discarded manual data entry quantity reason comment asset location on part |

Figure 4:
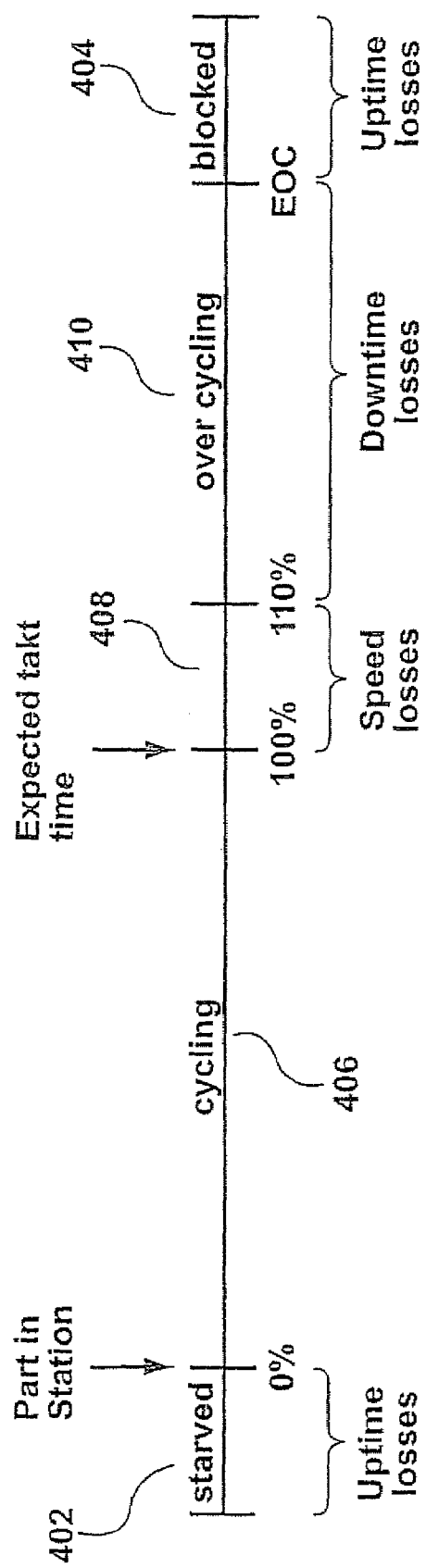
FIG. 4 illustrates schematically along a time axis categories of losses at a workstation.

Diagrammatically, FIG. 4 shows along a time axis losses that may be measured using signals collected by a PLC. FIG. 4 shows starved loss 402 as loss occurred prior to a workpiece entering a workstation. Blocked losses occur after a workpiece is processed but unable to exit from a workstation. Blocked loss 404 is shown as loss occurred after a workpiece is processed, i.e., after end of cycle (EOC). A downtime loss is considered to have occurred if the workstation spends longer than 110% of takt time to process a workpiece. The region between 110% of takt time (the threshold in this case) and end of cycle is marked as downtime region. A speed-loss 408 is when the workstation spends less than 110% of takt time but longer than takt time to process a workpiece.

In operation, the software system 130 receives three basic signal data from PLCs 122, converts the basic signals to time and count data and computes a throughput capability measure for each of the workstations 102 in the facility 100. The computation may be carried out using the expression shown in Equation (1), or a variation thereof. The results are analyzed to identify the constraint. Other signals may also be collected, converted and accumulated, to facilitate analysis of causes of performance degradation. The results of computation and analysis are displayed graphically to a user for clear identification of constraints and further analysis.

Figure 5:
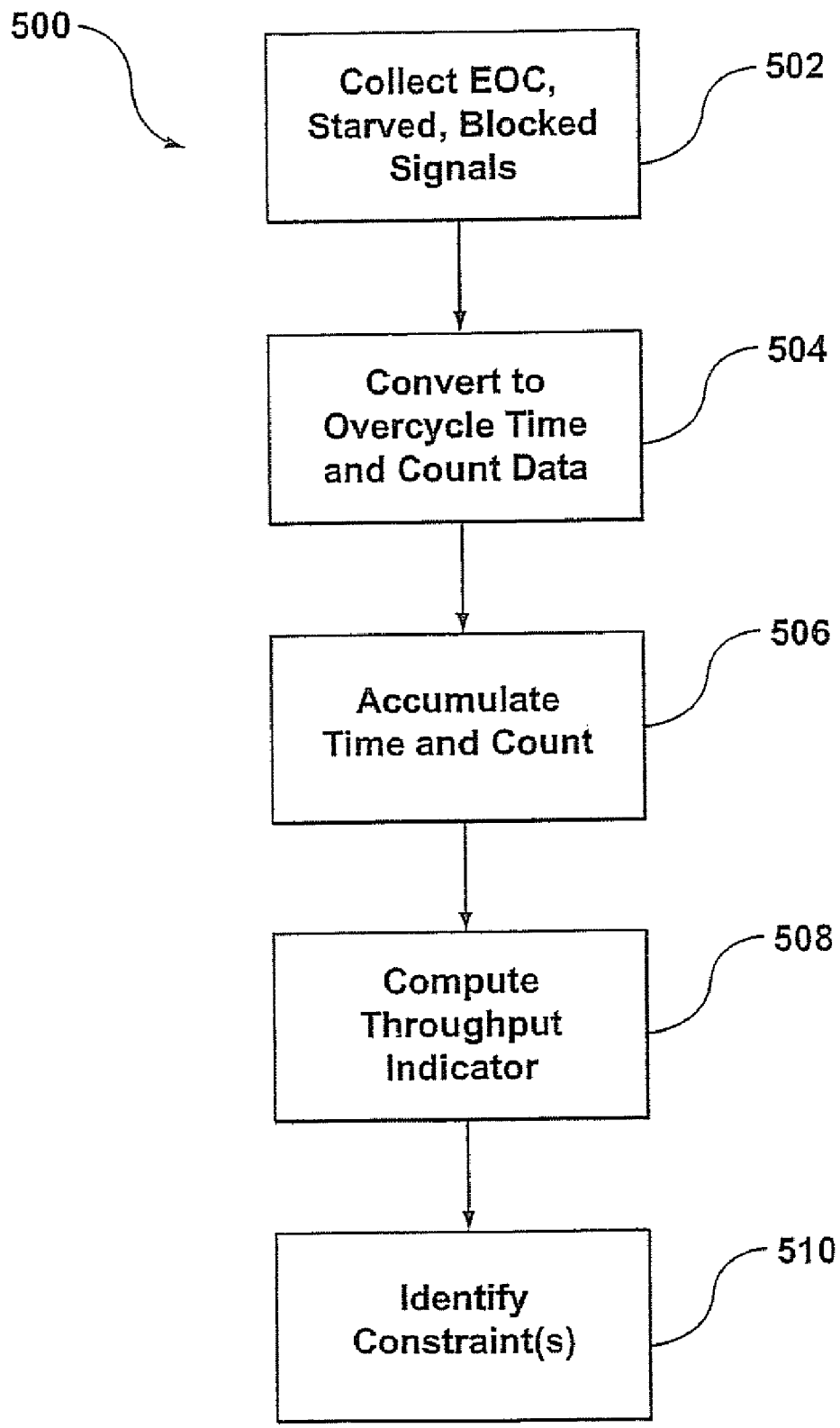
FIG. 5 is a flow chart illustrating steps of a process for identifying and quantifying constraints in an automated processing facility.

FIG. 5 is a flow chart illustrating a process 500 for quantifying and identifying constraints in an automated manufacturing or processing facility by computing and monitoring a throughput capability measure for each of the workstations. The process 500 involves the following steps:

automated collection of starved, blocked and EOC signals from workstations in an automated manufacturing and processing facility (step 502)

conversion of collected signals to overcycle time and part count data (step 504)

accumulation of overcycle time spent in processing each workpiece and accumulation of a total count of workpieces processed over a given period (step 506);

computation of a throughput capability measure using the accumulated overcycle time and the total number of workpieces processed (step 508); and a identifying a constraint or constraints (step 510).

As described earlier, signals collected at step 502 include state signals and event signals that a workstation is starved, blocked, or at the end of cycle. Also implicitly or explicitly collected are time information such as time and duration when these signals are turned on, kept on or turned off. Reason codes or brief description relating to degradation of performance of a workstation may be manually entered. The time an incident occurred may also be captured as a time stamp at the same time information is entered manually.

Collected signals are converted, i.e., transformed, to time and count data relating to performance of each workstation (step 504). For example, each time the workstation is at the end of cycle, which signals the completion of processing a workpiece, a total count of workpieces processed is incremented. Time spent between consecutive ends of cycle is calculated to obtain a part-to-part cycle time. A cycle time computed from the same workpiece's entrance time and exit time or accumulated using a timer can be used to compute a unit overcycle time. When amount of time in starved and blocked states is tracked, the unit overcycle time also excludes the amount of time in starved and blocked states. Similarly, when a workstation has built-in load delay or unload delay, such delays are also excluded from the unit overcycle time. A total overcycle time is accumulated from unit overcycle time of all workpieces processed over an accumulation period (step 506).

Conveniently, a downtime event trigger is generated if a workstation takes longer than a threshold to process a workpiece. The threshold may be, for example, 110% of takt time, or any suitable percentage of takt time. Any time above the threshold is counted toward the workstation's downtime loss. Of course, some other threshold, such as a value between 110% and 200% (or outside this range if appropriate), may be selected. The total time attributable to a workstation's downtime is accumulated over the accumulation period as well (step 506). By generating an event trigger and accumulating time loss in its specific category, the count and time data can be used to analyze losses in separate categories, which help isolating and identifying causes of low throughput. Other time and counts related to performance degradation, such as scrap loss, speed loss, quality loss, among others, are also accumulated at this step.

Figure 5B:
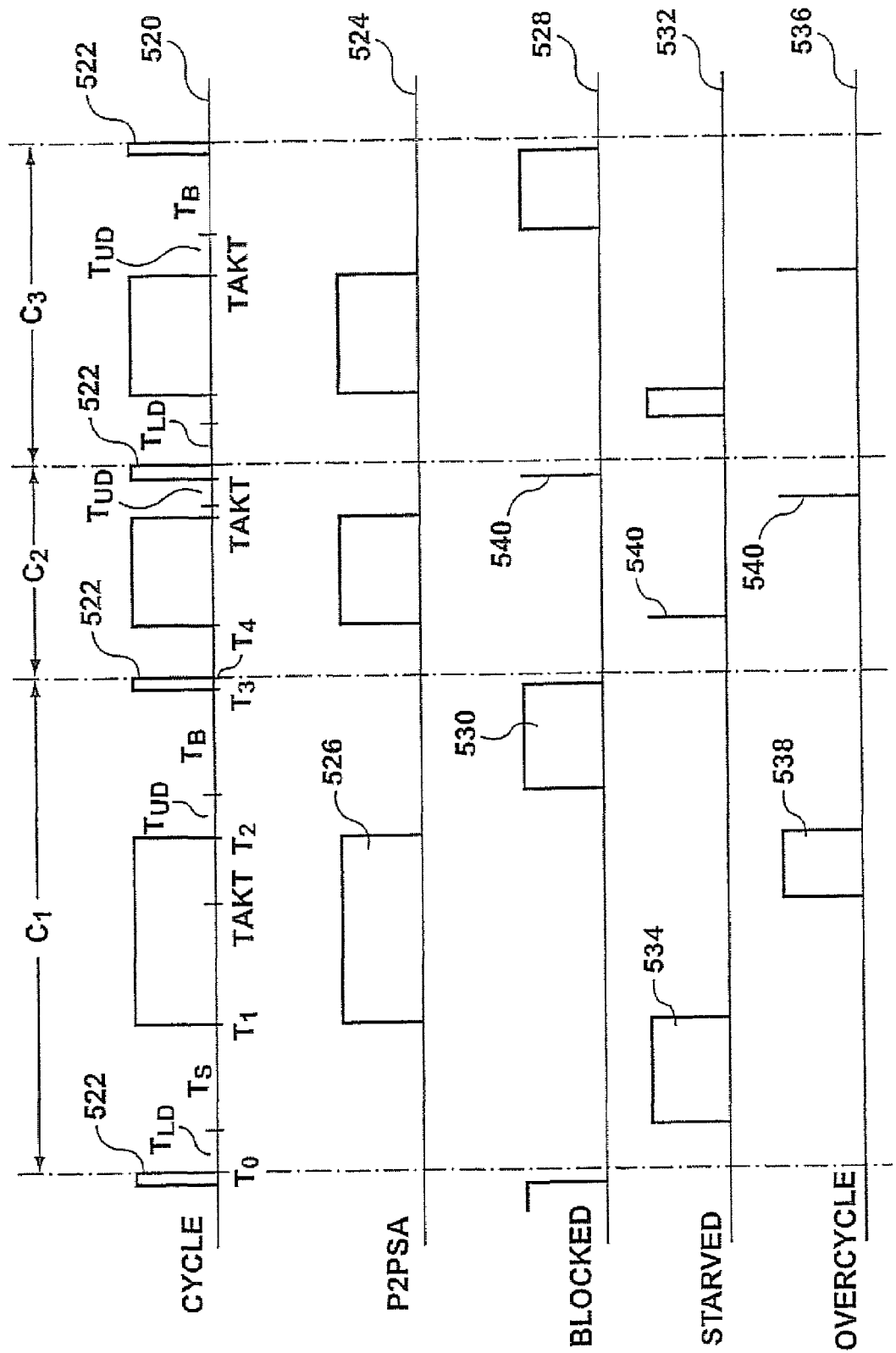
FIG. 5B depicts time markers associated with various state and event signals along time axis to illustrate conversion of these signals to time and count data and accumulation of converted time and count data.

Signal collection and data conversion are further described in reference to FIG. 5B. FIG. 5B illustrates the processing of three consecutive workpieces by a workstation by plotting along a timeline 520 various time markers associated with monitored state and event signals. Derived state and event signals are also plotted against their own respective timelines.

Refer to the segment of timeline 520, which illustrates the cycles of a workstation. The segment of timeline 520 in FIG. 5B shows only four EOC signals 522. As described earlier, the duration of an EOC signal is arbitrary and is selectable by a user. The end of an EOC signal (or any fixed point of an EOC signal) can be conveniently used to mark the beginning of a cycle. The segment of timeline 520 is divided by these four EOC signals into three sections, labeled as $C_1$, $C_2$ and $C_3$, representing, respectively, the first cycle, the second cycle and the third cycle. A the end of each EOC signal, a workpiece count is generated so that the total number of workpieces processed by a workstation over a given time period can be accumulated. Also converted and accumulated in each cycle are the other two basic signals, namely blocked signal and starved signal, and other time and count signals such as P2PSA signal, downtime loss count etc.

Consider the first cycle, $C_1$. The cycle begins at time $T_0$. After a built-in "Load Delay", or $T_{LD}$, the workstation anticipates that a workpiece will be loaded and that the "Part Present" bit 312 will be turned on. However, in the cycle illustrated, the workpiece is not loaded until a time $T_S$ later. Here, the time $T_S$ represents a starved period. The workpiece is loaded at time $T_1$ and processing of the workpiece begins. The processing is completed at time $T_2$. The duration $(T_2-T_1)$ is the part-to-part stand-alone time, or P2PSA time. In this cycle, the P2PSA time is longer than takt time, the ideal cycle time. Therefore, there is overcycle and the overcycle time during $C_1$ is non-zero. More precisely, the overcycle time is (P2PSA–takt). After the processing of the workpiece is completed, the workstation expects the workpiece to be unloaded within a built-in unload delay and to exit the workstation. However, in this cycle, the workstation is unable to unload the completed workpiece within the unload delay, $T_{UD}$, because the workstation is blocked. The workpiece is unloaded only after $T_B$, the duration when the workstation is blocked. The "Blocked" bit 304 is cleared at the moment $T_3$ when the workpiece is unloaded. The EOC signal is also generated to signal the beginning of the next cycle, which begins at $T_4$, or $T_0'$. This example should be contrasted to that shown in FIG. 3B, which depicts workstations with built-in load and unload delays but does not show any blocked nor starved conditions. It should also be noted that P2PSA time shown in this example is a measured cycle time.

Along a P2PSA timeline 524, a P2PSA signal 526 is plotted, corresponding to the duration between $T_1$ and $T_2$. This signal can be generated by accumulating the time using a timer from the moment $T_1$ to the moment $T_2$ when the signal is switched off or can be calculated by computing the difference between the recorded time values of $T_1$ and $T_2$. Similarly, along a Blocked signal timeline 528, a Blocked signal 530 is plotted, corresponding to the duration $T_B$, when the workstation is blocked. Preferably, or if desired, a blocked count signal can also be generated each time a Blocked signal is switched on so that the total number of occurrences of blocked condition can be tracked and analyzed. Likewise, along a Starved signal timeline 532, a starved signal 534 is plotted, corresponding to the duration $T_S$, when the workstation is starved. A starved count signal can be generated each time the Starved signal is switched on to track the total number of occurrences of starved conditions.

Similarly, along a Overcycle signal timeline 536, an overcycle signal 538 is plotted, corresponding to the time period between $T_2$ and takt time, when the workstation is overcycling. An overcycle count signal can also be generated each time the overcycle signal is switched on. As described earlier, when a workstation takes longer than takt time to process a workpiece, the loss can be categorized into two types: speed loss if the workstation takes longer than takt time but shorter than a threshold, or downtime loss if the workstation takes longer than the threshold to process the workpiece. A separate count signal indicating an occurrence of either a speed loss or a downtime loss can be conveniently generated, based on whether the P2PSA time is longer or shorter than the threshold, usually expressed as a percentage (e.g., 110%) of the takt time.

The cycle $C_2$ illustrates the next cycle, i.e., the processing of the next workpiece, in which the workstation is not starved nor blocked and the workstation spends less than takt time to complete processing the workpiece. Along the P2PSA timeline 524, a P2PSA signal is plotted, corresponding to the actual time the workstation spends to process the workpiece. On each of the Blocked signal timeline 528, the Starved signal timeline 532 and the Overcycle signal timeline 536, only a spike 540 is plotted, indicating that the duration the workstation is blocked, starved and overcycling, respectively, is zero. It should be noted that because the workstation spends less than the takt time to complete processing the workpiece, there is a speed-up. However, this speed-up is excluded from the calculation and the overcycle time is set to zero.

The cycle $C_3$ illustrates a cycle in which the workstation is starved and blocked but spends exactly the takt time to complete processing the workpiece. Non-zero blocked time and non-zero starved time are plotted on the Blocked signal timeline 528 and Starved signal timeline 532, but on the Overcycle signal timeline 536 there is only a spike to indicate that there is no overcycle time during this cycle.

When the time and count data are converted from raw signals received from a PLC, the time and count data are accumulated. For example, the P2PSA time is accumulated to obtain an accumulated P2PSA time over an accumulation period. The workpiece count data is accumulated to obtain a total count of workpieces processed during the accumulation period. The blocked time, starved time, overcycle time, total occurrences of speed loss, downtime loss etc. can all be accumulated. Here, the accumulation of time and count data can be carried out using special purpose counters or calculated from stored signal data along with their respective time information. For example, the P2PSA time can be accumulated by turning on a P2PSA timer each time the P2PSA signal comes on and switching off the P2PSA timer when the P2PSA signal subsequently is turned off. The value accumulated by the P2PSA timer will be the accumulated P2PSA time. On the other hand, a P2PSA time also can be computed for each cycle from the formula $(T_2-T_1)$ and an accumulated P2PSA time can be found by summing the P2PSA time from all cycles over the accumulation period. Obviously, any variation, using any combinations of timer accumulation and calculation of time values can be used to obtain the accumulated P2PSA time. Other accumulated time values and accumulated count values can also be similarly obtained either by using timers or counters, or from calculations using the converted and recorded signal data, or using a combination of timers, counters and calculations.

As will be appreciated, although signal collection and data conversion are described here as two steps, they may be performed by a single piece of hardware or a combination of hardware and software. For example, a PLC can perform signal collection and part of data conversion, or a PLC or a set of sensors can be used for nothing but collecting signals and off-load all of data conversion to RTLE. In other words, a time and count signal converter may be implemented as a RTLE, part of a PLC or a combination of a RTLE and a PLC, among others.

The throughput capability measure is computed from the formula at step 508, for example, using the formula shown in Equation (1). The throughput indicator, or the throughput capability measure, is calculated and updated almost in real-time, as each workpiece is being processed by the workstation or shortly thereafter. However, the value of the indicator itself reflects the behavior of a workstation over a long accumulation period, typically days, weeks or even months, over which each workstation's unit overcycling time is accumulated. In other words, the calculation of the throughput capability itself is historical in nature.

Once a throughput capability measure is obtained for each of the workstations 102, the results can be displayed graphically to clearly show the performance of each workstation. The results can also be analyzed to identify a constraint (step 510). Different criteria can be used for identifying a constraint using the computed throughput capability measures. A criteria is generally pre-selected by a user from a pool of suitable criteria or may be directly entered by a user. For example, a constraint can be identified as a workstation that has the lowest throughput capability measure among all workstations in the production line.

Figure 6:
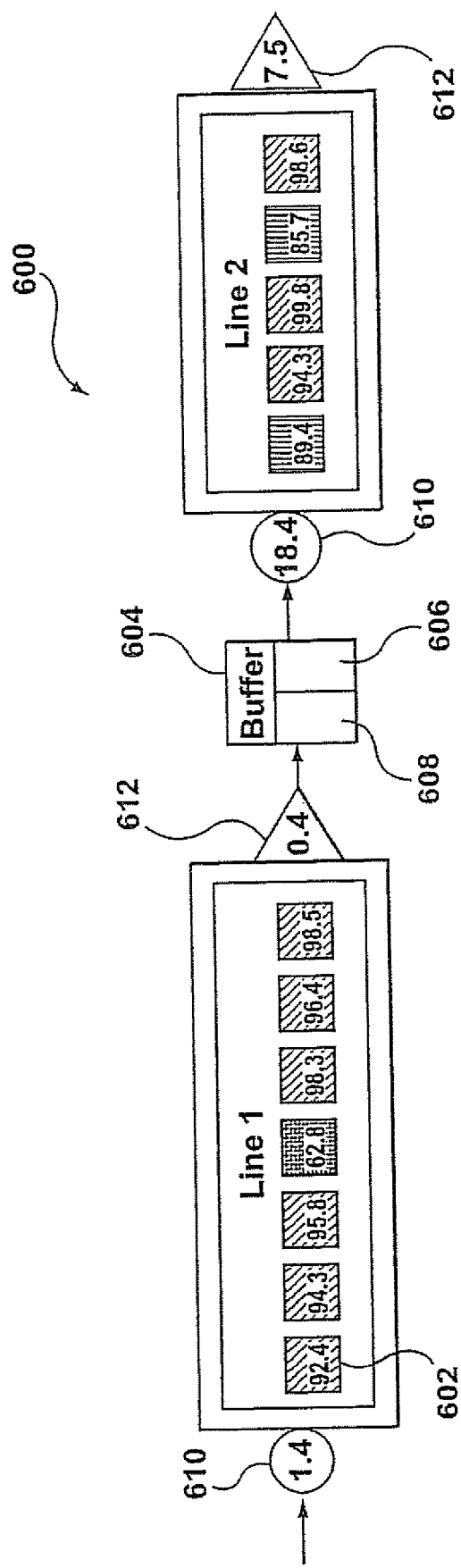
FIG. 6 is a graphical representation for presenting graphically throughput capability measures of workstations in two sequential production lines.

Conveniently, results of the throughput analysis are presented to users graphically on a computer monitor 132. FIG. 6 shows a graphical representation 600 of two production lines (Line 1 and Line 2) linked sequentially together. Each production line has a number of workstation icons 602, representing sequentially linked workstations. A throughput capability measure corresponding to each workstation is displayed numerically inside the workstation's icon 602. The icons may also be color coded to indicate if the workstation is operating at or near maximum capacity, at reduced capacity, or is considered a constraint. For example, the constraint, having the lowest throughput capability, may be colored red. The next group of workstations, having the next lowest throughput capability, are colored yellow. The remaining workstations may be represented by icons colored green. Between each production line is a buffer icon 604, showing the percentage the buffer is full (right half 606 showing the present value; left half 608 showing the average value over the accumulation period). A starved icon 610, a circle to the left of each production line, indicates the percentage of capacity loss due to starved conditions at the input point of a production line. A blocked icon 612, the triangle to the right of each production line, indicates the percentage of capacity loss due to the blocked conditions at the exit point of the production line.

Figure 7:
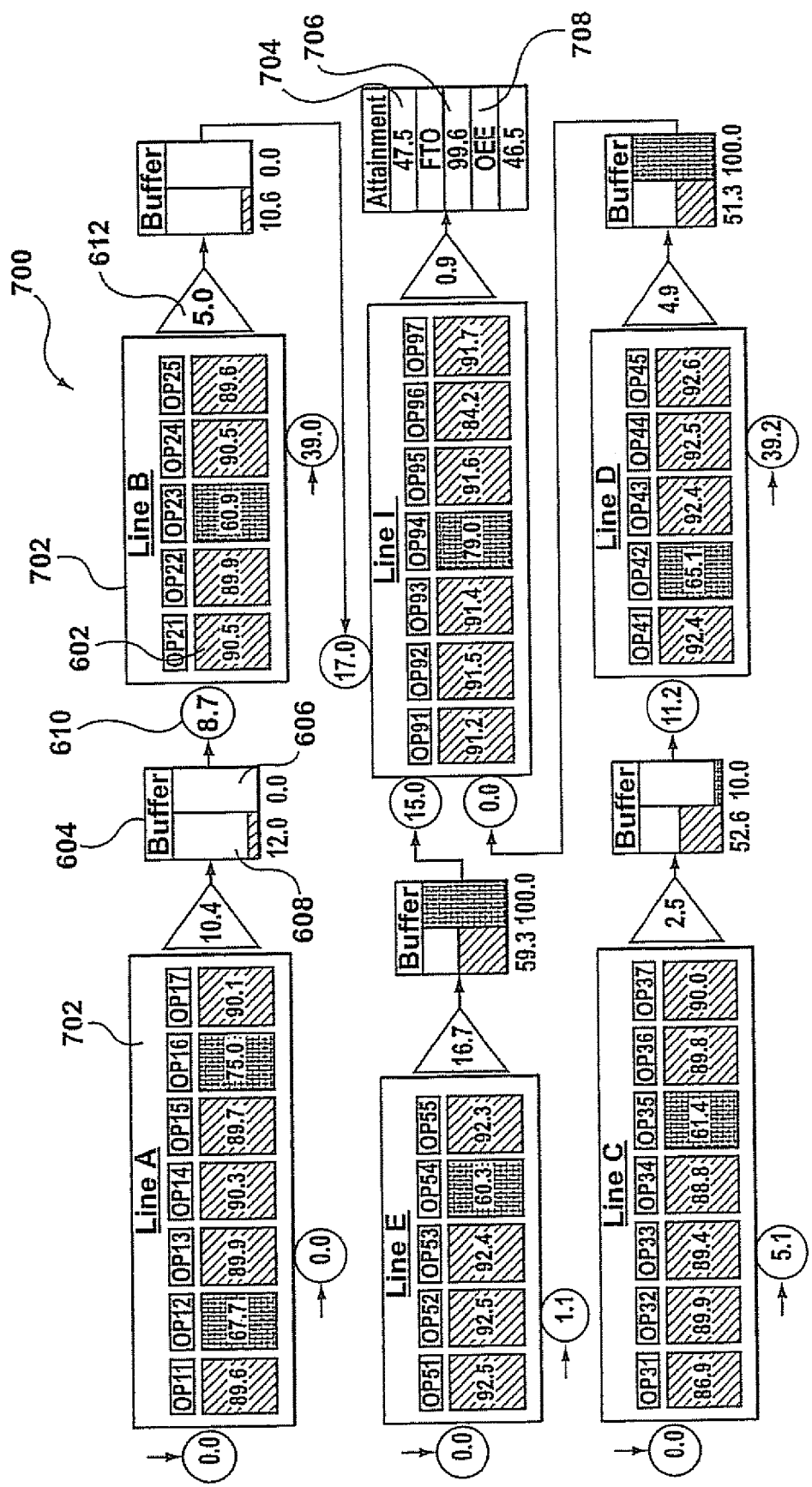
FIG. 7 shows a throughput capability and balance map for presenting graphically throughput capability measures and other performance indicators for a plurality of production lines linked in sequential and parallel fashions.

Preferably, throughput capability measures of all workstations in a facility 100 is presented using a throughput capability and balance map. FIG. 7 is an exemplary throughput capability and balance map 700. It shows a plurality of production lines linked in sequential and parallel fashions. The throughput capability and balance map 700 shown in FIG. 7 provides a concise and clear view of performances of all automated assets 102 in a facility 100.

The map 700 represents six production lines 702, Lines A to E and Line I. The output of Line A is supplied to Line B as input, in a sequential link. The output of Line C is supplied to Line D as its input. The outputs of Lines B, D, E are all provided to Line I, which are processed and combined by Line I, as products at the exist point of Line I. In addition to throughput capability measures, starved and blocked losses, and buffer level, the map 700 also displays numerically additional performance indicators, such as attainment 704, FTQ 706 (first time quality) and OEE 708 (overall equipment efficiency). Of course, where desirable, other performance indicators measuring the performance of the entire facility, such as JPH, MTBF, or MTTR, may also be displayed on the map 700.

The map 700 may also provide actuatable regions (or "clickable areas") allowing a user to drill down, i.e., to request and display more detailed information about a workstation. Any icons corresponding to a workstation, a buffer, an input point or an exit point, such as a workstation icon 602, may be rendered "clickable". A user may "click" an icon using a computer pointing device to bring up another screen which provides more detailed information than the simple numerical value displayed in the icon. Further drill-down may be provided so that each screen activated by clicking an icon may have on it additional actuatable regions for displaying even more detailed information, and so on.

Figure 8:
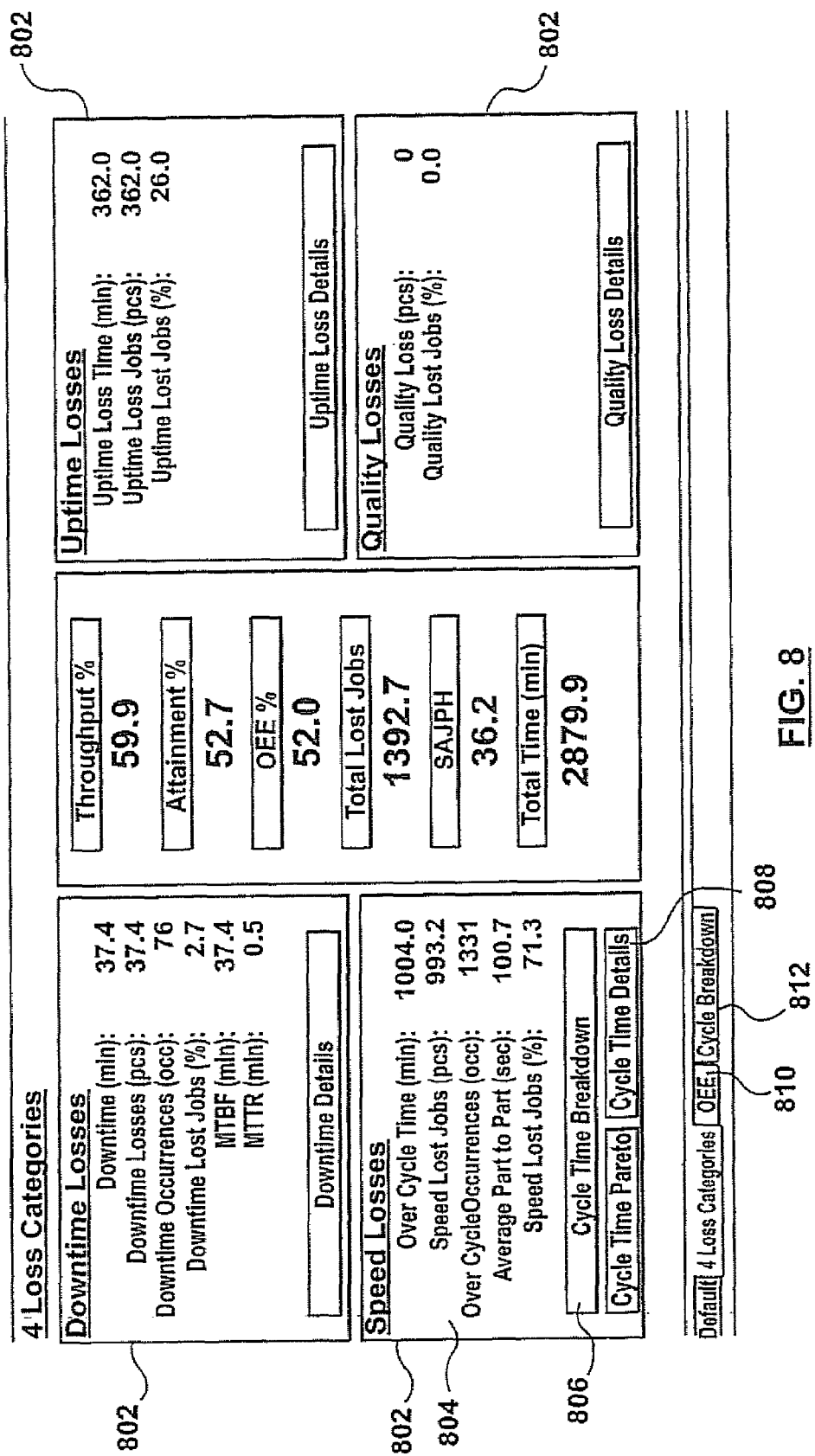
FIG. 8 is an exemplary screen display showing detailed information relating to losses in different categories.

FIG. 8 is an exemplary screen showing detailed information relating to different categories of losses. This screen may be displayed by actuating one of the workstation icons 602. The screen has four separate loss information regions 802, each for a type of loss. Each loss information region 802 provides details related to that type of loss. For example, in the speed loss region 804, displayed are details such as total overcycle time, total number of equivalent workpieces lost due to speed loss over the accumulation period, the total number of occurrences in which a workpiece experience overcycle, etc. Further drill-down, such as a breakdown of cycle time 806, or cycle time details 808, can be requested through actuatable regions, or clickable buttons, in the speed loss region 804. The screen 800 also provides tabs such as OEE tab 810, Cycle Breakdown tab 812, for accessing other types of detailed information. It will be appreciated that the content of the detailed information as well as the type of detailed information are not restricted to what are shown in FIG. 8 and may be any that are suitable or desirable according to a specific application or user requirements. FIG. 9 is another exemplary screen display showing detailed information related to OEE.

Figure 10:
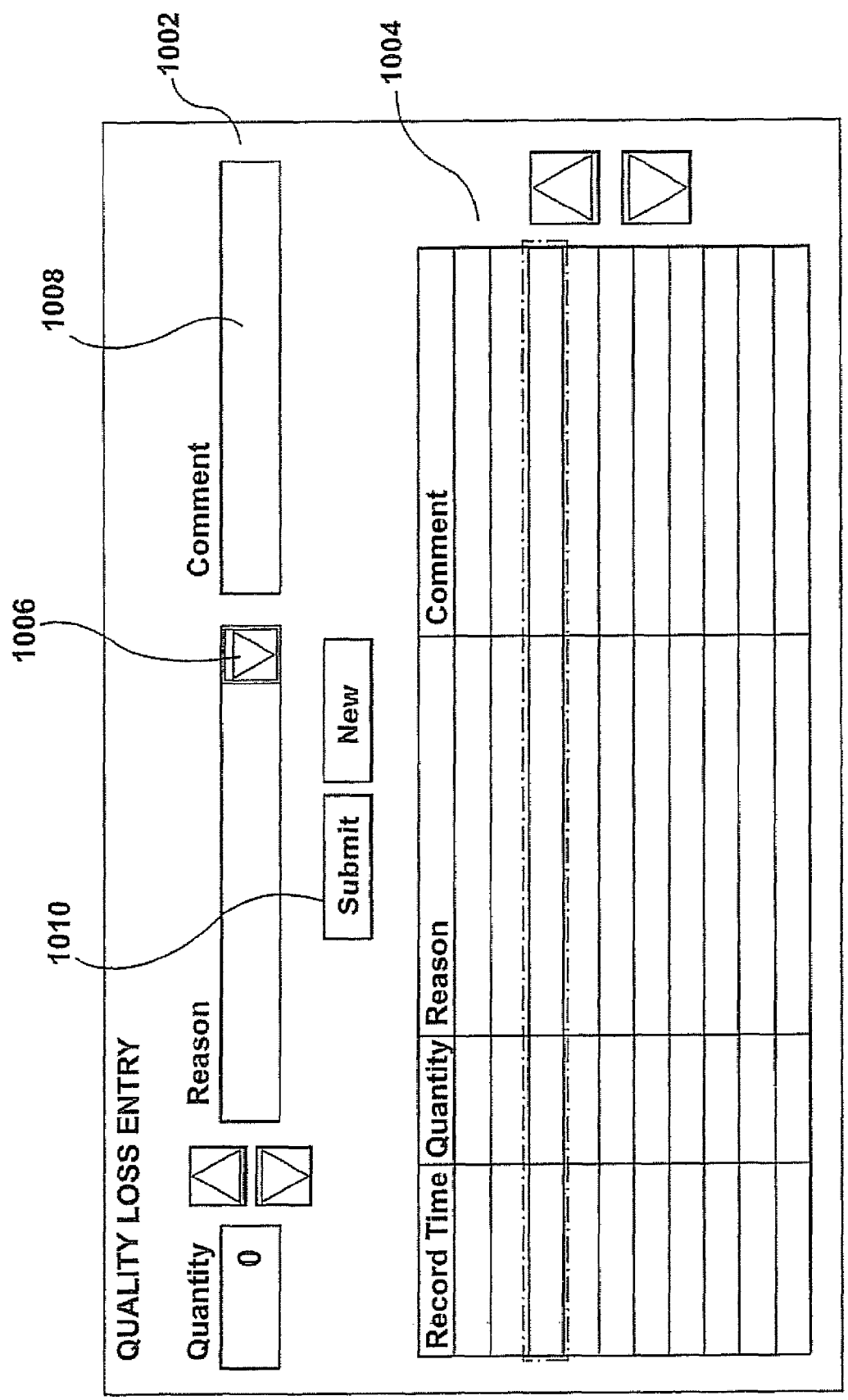
FIG. 10 is an exemplary screen display for a user to enter information manually, providing information relating to causes of quality loss at a workstation.

As mentioned earlier, the system also allows a user such as a floor operator to enter detailed description manually. Manually entered information may include description of slow-down or downtime of a workstation, "reason" code for conditions that cause a loss, among others. FIG. 10 is one such exemplary screen display. The screen has data entry region 1002 and a form window 1004. Conveniently, an operator only needs to enter the quantity of workpieces that are discarded for quality defects and select a reason code from a pull-down menu 1006. Where appropriate, a brief comment may also be entered in the "Comment" box 1008. Once the "Submit" button 1010 is clicked, the input received from the operator will be recorded, together with a "record time" that can be automatically retrieved from the system and recorded. This new entry can also be displayed in a form window 1004 below the data entry region 1002 for review and correction, if necessary. This allows the generation of statistics of reasons or reason codes corresponding to causes of losses or performance degradation.

Figure 11:
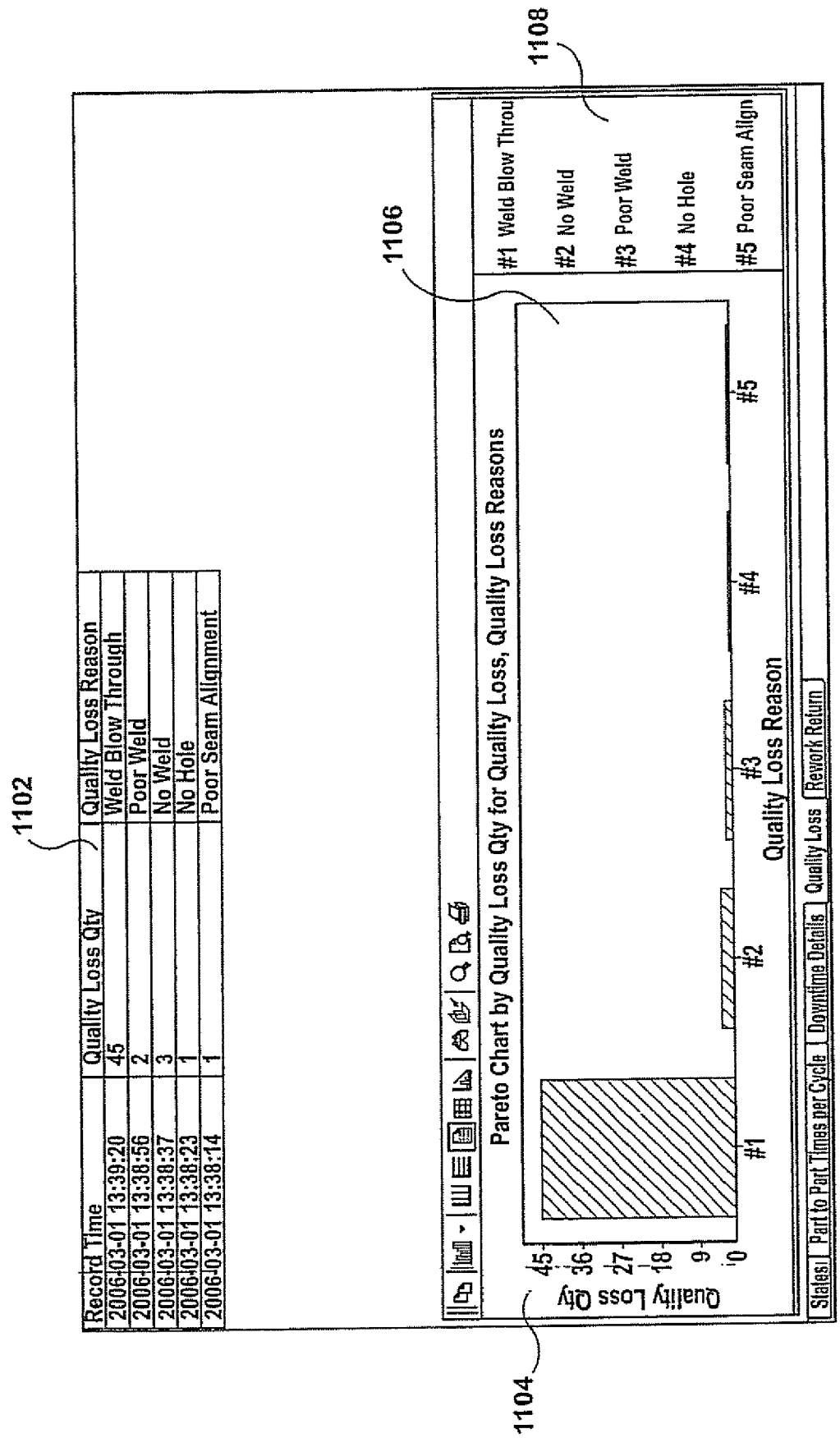
FIG. 11 is an exemplary screen display that shows the statistics of quality losses over a given monitored period.

FIG. 11 is an exemplary screen display that shows the statistics of quality losses over the monitored period. The screen display has a text region 1102 and a graph region 1104. Numerical results as well as textural information are displayed in the text region 1102. The information displayed may include the time the information was entered, the quantity of loss due to a particular reason or having a particular reason code, as well as a description of a reason code. The graph region 1104 is used for displaying a suitable graph 1106 showing the results of the statistical analysis. The graph 1106 may be a histogram graph, a line graph, a bar chart, among others. A histogram graph is shown in FIG. 11, together with legends 1108 showing the reason codes and their brief description. As the chart and the graph show, one reason code corresponds to the majority one of the losses, this screen helps to identify one area that may significantly improve the throughput.

Various embodiments of the invention have now been described in detail. Those skilled in the art will appreciate that numerous modifications, adaptations and variations may be made to the embodiments without departing from the scope of the invention. Since changes in and or additions to the above-described best mode may be made without departing from the nature, spirit or scope of the invention, the invention is not to be limited to those details but only by the appended claims.

What is claimed is:

1. A system for quantifying and identifying a constraint in an automated manufacturing facility, said automated manufacturing facility having automated workstations for automatically processing workpieces, the system comprising:
   a plurality of signal converters, each of said plurality of signal converters continuously receiving event and state signals collected at a respective automated workstation, and transforming said event and state signals to time and count data, said time and count data including an overcycle time spent by said respective automated workstation during each process cycle of processing a workpiece and a workpiece count;
   a data modeling engine communicating with said plurality of signal converters;
   said each signal converter including a computing unit, said computing unit calculating a throughput capability measure of said respective automated workstation upon completion of said each process cycle at said respective workstation, said throughput capability measure being calculated from an expected processing time and an accumulated overcycled processing time accumulated over an accumulation period; and
   said data modeling engine receiving from said plurality of signal converters said throughput capability measures and identifying the constraint as a workstation whose throughput capability measure meets a pre-selected criteria,
wherein said overcycle time is a non-negative quantity derived from a difference between a cycle time of said each process cycle and an ideal cycle time, said overcycle time excluding time spent by said respective workstation during starved and blocked states during said each process cycle, wherein said expected processing time and said accumulated overcycled processing time are accumulated from said ideal cycle time and an overcycled processing time, respectively, over said accumulation period, and wherein said overcycled processing time is a sum of said overcycle time and said ideal cycle time.

2. The system of claim 1, further comprising a historical data database and a queue manager, said queue manager arranging for the storing of said time and count data in the historical data database.

3. The system of claim 2, further comprising a manual entry interface for receiving performance information relating to a workstation of said workstations from a user, wherein said data modeling engine includes said performance information in an analysis of performance of the facility.

4. The system of claim 3, wherein said data modeling engine includes a statistics analysis module, said statistics analysis module receiving data from said historical data database and generating reports from statistics data of causes contributing to a degradation of performance of the workstations.

5. The system of claim 4, further comprising a graphical user interface for displaying said reports in at least one of textual and graphical formats.

6. The system of claim 1, further comprising a graphical user interface for displaying a graphical representation of said throughput capability measures of said workstations to a user, said graphical representation including workstation icons, each of said workstation icons corresponding to one of said workstations and showing a numerical value of said throughput capability measure.

7. The system of claim 6, wherein said graphical representation includes one or more state icons positioned adjacent each workstation icon of said workstation icons, said one or more state icons each showing a time percentage said each workstation spending in a represented respective state.

8. The system of claim 7, wherein said one or more state icons include a starved state icon and a blocked state icon, said starved state icon being arranged at an upstream location and said blocked state icon being arranged at a downstream location relative to said each workstation icon.

9. The system of claim 7, wherein said one or more state icons and said each workstation icon are actuatable for displaying additional information relating to said each workstation.

10. A system for quantifying and identifying a constraint in an automated manufacturing facility, said automated manufacturing facility having sequentially linked, automated workstations for automatically processing workpieces, the system comprising:
   a plurality of signal converters, each of said plurality of signal converters continuously receiving starved, blocked and EOC signals collected at a respective automated workstation, and transforming said starved, blocked and EOC signals to time and count data, said time and count data including a measured cycle time spent by said respective automated workstation processing a workpiece during each process cycle, an overcycle time spent by said respective automated workstation during said each process cycle and a workpiece count;
   data accumulators for accumulating said time and count data received from said each signal convertor, said accumulated time and count data including an accumulated overcycle time, an accumulated ideal processing time and a total workpiece count over an accumulation period;
   a historical data database for storing said time and count data and said accumulated time and count data;
   a data modeling engine communicating with said plurality of signal converters and said historical data database;
   said each signal converter including a computing unit, said computing unit calculating a throughput capability measure of said respective automated workstation upon completion of said each process cycle at said respective workstation, said throughput capability measure being calculated from a ratio of said accumulated ideal processing time to an accumulated overcycled processing time; and
   said data modeling engine receiving from said plurality of signal converters said throughput capability measures and identifying a workstation having the smallest throughput capability measure as the constraint,
wherein said overcycle time is a non-negative quantity derived from a difference between said measured cycle time and an ideal cycle time, wherein said accumulated ideal processing time is a product of said ideal cycle time and said total workpiece count, and wherein said accumulated overcycled processing time is a sum of said accumulated ideal processing time and said accumulated overcycle time.

11. The system of claim 10, further comprising a queue manager, said queue manager arranging for the storing of said time and count data and said accumulated time and count in the historical data database.

12. The system of claim 10, wherein each of said data accumulators includes a memory buffer for temporary storage of said time and count data and said accumulated time and count data prior to storing said time and count data and said accumulated time and count data in said historical data database.

13. The system of claim 10, further comprising a graphical user interface for displaying a graphical representation of said throughput capability measures of said workstations to a user, said graphical representation including workstation icons, each of said workstation icons corresponding to one of said workstations and showing a numerical value of said throughput capability measure.

14. The system of claim 13, wherein said graphical representation includes one or more state icons positioned adjacent each workstation icon of said workstation icons, said one or more state icons each showing a time percentage said each workstation spending in a represented respective state.

15. The system of claim 14, wherein said one or more state icons include a starved state icon and a blocked state icon, said starved state icon being arranged at an upstream location and said blocked state icon being arranged at a downstream location relative to said each workstation icon.

16. The system claim 13, wherein said graphical representation includes one or more statistics icons, said one or more statistic icons providing performance related statistics data associated with said workstations retrieved from said historical data database.

17. The system of claim 16, wherein said one or more statistics icons includes at least one buffer icon located adjacent two workstation.

18. The system of claim 14, wherein said one or more state icons and said each workstation icon are actuatable for displaying additional information relating to said each workstation.

19. The system of claim 10, further comprising a manual entry interface for receiving performance information relating to a workstation of said workstations from a user, wherein said data modeling, engine includes said performance information in an analysis of performance of the facility.

20. The system of claim 19, wherein said data modeling engine includes a statistics analysis module for generating reports from statistics data of causes contributing to a degradation of performance of the workstations.

21. The system of claim 20, further comprising a graphical user interface for displaying said reports in at least one of textual and graphical formats.

22. A method of monitoring and managing performance of an automated processing facility, said method comprising the steps of:

continuously receiving state and event signals automatically collected from workstations in the automated processing facility;

converting said state and event signals to time and count data, said time and count data of each of said workstations including at least an overcycle time, said overcycle time being a non-negative quantity derived from a difference between a measured cycle time and an ideal cycle time;

accumulating said time and count data over an accumulation period for said workstations, said accumulated time and count data including at least a total count of workpieces processed by said each workstation during said accumulation period and an accumulated overcycle time accumulated from said overcycle time;

continuously computing a throughput capability measure for each workstation upon said each workstation completing processing a workpiece, said throughout capability measure being computed from said total count, said accumulated overcycle time and said ideal cycle time; and identifying a constraint in the automated manufacturing facility from the throughput capability measures of said workstations, said constraint being a workstation having the smallest throughput capability measure.

23. The method of claim 22, further comprising the step of monitoring reduction of said accumulated overcycle time of said constraint workstation.

24. The method of claim 22, wherein said time and count data of said each workstation includes a first amount of time spent by said each workstation in starved state and a second amount of time spent by said each workstation in blocked state, and said method further comprising the step of displaying the throughput capability measure, information derived from said first amount of time and information derived from said second amount of time in icons associated with said each workstation.

25. The method of claim 24, further comprising the step of color coding icons associated with said each workstation in accordance with numerical values of said throughput capability measures.

* * * * *